US008033240B2

(12) United States Patent
Miyasaka

(10) Patent No.: US 8,033,240 B2
(45) Date of Patent: *Oct. 11, 2011

(54) APPARATUS FOR EJECTING LIQUID DROPLET, WORK TO BE APPLIED THERETO, METHOD OF MANUFACTURING ELECTRO-OPTIC DEVICE, ELECTRO-OPTIC DEVICE, AND ELECTRONIC EQUIPMENT

(75) Inventor: Yoichi Miyasaka, Suwa (JP)

(73) Assignee: Seiko Epson Corporation (JP)

( * ) Notice: Subject to any disclaimer, the term of this patent is extended or adjusted under 35 U.S.C. 154(b) by 142 days.

This patent is subject to a terminal disclaimer.

(21) Appl. No.: 12/419,356

(22) Filed: Apr. 7, 2009

(65) Prior Publication Data

US 2009/0195595 A1 Aug. 6, 2009

Related U.S. Application Data

(62) Division of application No. 11/226,770, filed on Sep. 14, 2005, now Pat. No. 7,601,219.

(30) Foreign Application Priority Data

Oct. 21, 2004 (JP) ................................. 2004-307345

(51) Int. Cl.
*B05C 5/02* (2006.01)
*B41J 2/165* (2006.01)

(52) U.S. Cl. .......... 118/302; 118/325; 118/501; 347/29; 347/36; 239/106; 239/121

(58) Field of Classification Search .................. 118/302, 118/325, 501, 300, 313–315, 305; 347/29, 347/30, 36, 23, 24, 31, 85, 86, 82, 40, 33; 239/106, 120, 121; 427/58; 428/195.1
See application file for complete search history.

(56) References Cited

U.S. PATENT DOCUMENTS

| 7,246,878 | B2 | 7/2007 | Ogawa et al. | |
| 7,344,222 | B2 | 3/2008 | Nakamura | |
| 7,601,219 | B2 * | 10/2009 | Miyasaka | ..................... 118/302 |
| 2002/0122093 | A1 | 9/2002 | Otsuka | |

(Continued)

FOREIGN PATENT DOCUMENTS

JP 2001-071521 3/2001
(Continued)

OTHER PUBLICATIONS

Communication from Korean Intellectual Property Office regarding corresponding application.

*Primary Examiner* — Yewebdar Tadesse
(74) *Attorney, Agent, or Firm* — Harness, Dickey & Pierce, P.L.C.

(57) ABSTRACT

An apparatus for ejecting liquid droplets for drawing a pattern on a workpiece having drawing areas in a longitudinal direction includes: a suction table disposed in a drawing space for holding the workpiece by suction; a delivering unit that intermittently delivers the workpiece onto the suction table in a sagged state; a drawing unit that draws a pattern on the workpiece held by suction by driving the functional liquid droplet ejection head to eject liquid droplets; a workpiece receiving unit that receives the drawn-on workpiece in a sagged state from the suction table; and a flushing unit on a feeding path of the work and including a flushing box provided between a lower surface of the functional liquid droplet ejection head and a sagged portion at least at one of the sagged portions of the workpiece for receiving ejected liquid droplets from the functional liquid droplet ejection head.

6 Claims, 23 Drawing Sheets

U.S. PATENT DOCUMENTS

| | | |
|---|---|---|
| 2003/0201244 A1 | 10/2003 | Ogawa et al. |
| 2003/0206210 A1 | 11/2003 | Nakamura |
| 2004/0218002 A1 | 11/2004 | Nakamura |
| 2005/0045096 A1* | 3/2005 | Kojima ................. 118/323 |

FOREIGN PATENT DOCUMENTS

| | | |
|---|---|---|
| JP | 2001-105170 | 4/2001 |
| JP | 2001-293852 | 10/2001 |
| JP | 2003-265996 | 9/2003 |
| JP | 2003-266673 | 9/2003 |
| JP | 2004-195908 | 7/2004 |
| JP | 2004-209460 | 7/2004 |
| KR | 2001-0053476 | 6/2001 |
| KR | 2004-42811 | 5/2004 |
| WO | WO 00/68015 | 11/2000 |

* cited by examiner

F I G. 3
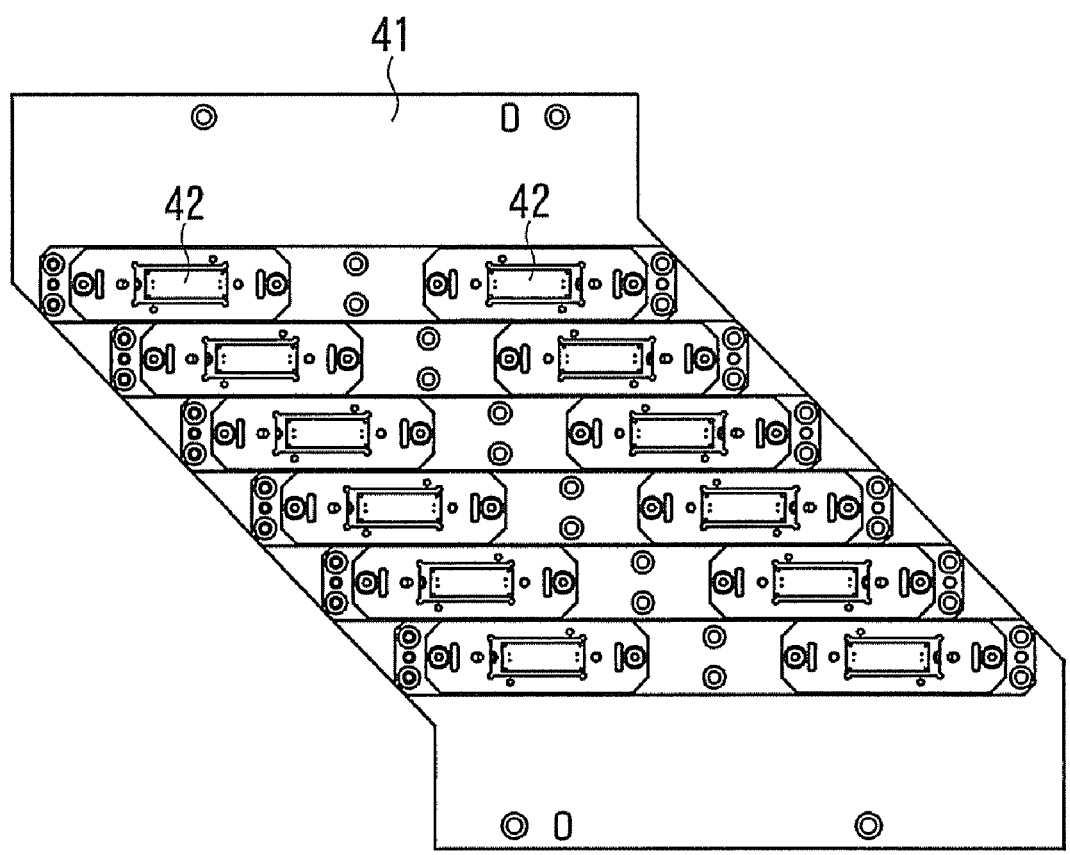

APPARATUS FOR EJECTING LIQUID DROPLET, WORK TO BE APPLIED THERETO, METHOD OF MANUFACTURING ELECTRO-OPTIC DEVICE, ELECTRO-OPTIC DEVICE, AND ELECTRONIC EQUIPMENT

This application is a divisional of U.S. patent application Ser. No. 11/226,770 filed on Sep. 14, 2005, now U.S. Pat. No. 7,601,219 issued on Oct. 13, 2009. This application claims the benefit of Japanese Patent Application No. 2004-307345 filed Oct. 21, 2004. The disclosures of the above applications are incorporated herein by reference.

BACKGROUND OF THE INVENTION

1. Field of the Invention

The present invention relates to an apparatus for ejecting liquid droplet for drawing (picturing) a pattern on an elongated work (or workpiece) by using a functional liquid droplet ejection head, a work to be applied thereto, a method of manufacturing an electro-optic device, an electro-optic device, and electronic equipment.

2. Description of the Related Art

The apparatus for ejecting liquid droplet (also referred to as the liquid droplet ejection apparatus) includes an X-axis table for moving a suction table (set table) on which a sheet-type board (work) is mounted in the X-axis direction, a Y-axis table for moving the head unit on which a functional liquid droplet ejection head is mounted in the Y-axis direction, and is adapted in such a manner that a predetermined pattern is drawn on a board set thereon by driving the functional liquid droplet ejection head to discharge or eject while relatively moving the head unit and the board.

The liquid droplet ejection apparatus includes a pair of flushing boxes for receiving waste ejection from (all the ejection nozzles of) a functional liquid droplet ejection head. The pair of flushing boxes are movably supported by the X-axis table and are disposed with the intermediary of the suction table therebetween in the X-axis direction. Therefore, when the X-axis table is driven, the head unit faces the flushing boxes and the set table (work) in sequence, and then the drawing operation is continuously carried out after the flushing operation. In this manner, by carrying out the flushing operation prior to the drawing operation, the functional liquid droplet ejection state of the functional liquid droplet ejection head can be stabilized, whereby the drawing process with high degree of accuracy is performed with respect to the work (see, e.g., JP-A-2003-266673).

In order to improve drawing efficiency with respect to the work, there is contemplated a liquid droplet ejection apparatus of roll-to-roll system in which a roll-type work having a plurality of actual drawing areas for drawing a drawing pattern provided in the longitudinal direction is introduced into a liquid droplet ejection apparatus, and drawing process is carried out for each actual drawing area while delivering (paying out) the work, and then the processed work is wound in sequence. However, in this case, since the work is delivered continuously, the flushing boxes cannot be disposed in the X-direction, which is the delivering direction of the work, and hence the flushing operation cannot be carried out with respect to the actual drawing areas before the drawing operation.

SUMMARY OF THE INVENTION

Therefore, it is an advantage of the invention to provide an apparatus for ejecting liquid droplet in a roll-to-roll system in which a flushing operation can be carried out immediately before carrying out the drawing operation on actual drawing areas provided on roll-type work and in which stable drawing with respect to the actual drawing areas is achieved. It also provides a work to be applied thereto, a method of manufacturing an electro-optic device, the electro-optic device, and electronic equipment.

According to one aspect of the invention, there is provided an apparatus for ejecting liquid droplet for drawing a pattern on a work having a plurality of drawing areas provided in the longitudinal direction, the apparatus comprising: a suction table disposed in a drawing space for setting the work by suction; a delivering apparatus for delivering the work intermittently for introducing the work onto the suction table in a sagged state; a drawing means for drawing a pattern on the work set by suction by driving the functional liquid droplet ejection head to eject liquid droplet; a work receiving means for receiving the drawn work in a sagged state from the suction table; and a flushing unit including a flushing box for receiving ejection from the functional liquid droplet ejection head located at least at one of the sagged portions of the work.

In this arrangement, the flushing box is disposed on one of the sagged portion of the work between the delivering apparatus and the suction table, and the sagged portion of the work between the suction table and the work receiving means. Therefore, by moving the functional liquid droplet ejection head relatively with respect to the drawing space at the time of drawing process, the functional liquid droplet ejection head is faced to the flushing box for the flushing operation. In this case, since the suction table and the flushing box are arranged adjacently to each other, the functional liquid droplet ejection head can carry out the flushing operation before carrying out the drawing operation with respect to the work (drawing area) on the suction table. Therefore, in the drawing operation, the functional liquid can be ejected stably from the functional liquid droplet ejection head, whereby drawing on the drawing area with high degree of accuracy is achieved.

In this case, preferably, the work is provided with alignment marks for correcting the positions of the respective drawing areas, and an image recognition means for photographing the alignment marks and recognizing the image, and a θ-table for correcting the position in the horizontal plane of the drawing area with respect to the functional liquid droplet ejection head are further provided.

In this arrangement, since the alignment marks are provided corresponding to the respective drawing areas, θ-correction (positional correction) of the drawing area can be achieved based on the image recognition, whereby drawing with high degree of accuracy can be achieved.

In this case, the flushing box is preferably supported by the θ-table.

In this arrangement, when the θ-correction of the suction table is carried out, the flushing box is also θ-rotated with the suction table. Accordingly, the flushing box can be adequately faced to the actual drawing area which is corrected in position correspondingly.

In this case, preferably, the flushing box is formed corresponding to the inclination of the sagged portion on the suction table side.

In this arrangement, the flushing box can be arranged at a position as close as possible to the suction table without interference between bottom portions of the flushing box with the work. Even when the sag is relatively small, the flushing box can be disposed at the sagged portion.

In this case, the work receiving means preferably winds the work.

In this arrangement, since the work after having gone through the drawing process is wound into the roll-shape, handling of the work after the drawing process can be facilitated.

According to another aspect of the invention, there is provided a work on which drawing is made by the above-described apparatuses for ejecting liquid droplet.

In this arrangement, since the drawing is performed by any one of the above-described apparatuses for ejecting liquid droplet, the drawing with high degree of accuracy is provided on the work.

In this case the work is preferably a flexible board with an electronic part mounted thereon.

In this arrangement, by introducing the roll-type work into the apparatus for ejecting liquid droplet for performing the drawing process, the flexible board can be manufactured efficiently.

According to another aspect of the invention, there is provided a method of manufacturing the electro-optical device. The method is characterized by forming a film formed portion with functional liquid droplet on the work using the above-described apparatus for ejecting liquid droplet. According to still another aspect of the invention, there is provided an electro-optical device which is characterized in that the film formed portion is formed on the work by the functional liquid droplet using the above-described apparatus for ejecting liquid droplet.

In this arrangement, since the above-described apparatus for ejecting liquid droplet is used, the functional liquid can be ejected stably on the actual drawing area. Therefore, the film formed portion can be formed with high degree of accuracy, and the electro-optical device with high degree of accuracy can be manufactured with high efficiency. As the electro-optical device, a fluid crystal display device, an organic EL (Electro-Luminescence) device, an electron emission device, a PDP (Plasma Display Panel) device, and an electrophoresis display device may be exemplified. The electron discharge device conceptually includes so-called FED (Field Emission Display) device or SED (Surface-Conduction Electron-Emitter Display) device. The electro-optical device includes a device for metal wiring formation, lens formation, resist formation, and light diffuser formation.

The electronic equipment of the invention is characterized in that the electro-optical device manufactured by the above-described method of manufacturing the electro-optical device or the above-described electro-optical device is mounted thereto.

In this case, the electronic equipment corresponds to various electrical products in addition to mobile phones and personal computers having so-called flat panel display mounted thereon.

BRIEF DESCRIPTION OF THE DRAWINGS

FIG. 1 is an explanatory drawing illustrating a apparatus for ejecting liquid droplet according to an embodiment of the invention, in which FIG. 1A is a plan view of the apparatus for ejecting liquid droplet, and FIG. 1B is an enlarged plan view of a work;

FIG. 2 is an explanatory drawing illustrating a apparatus for ejecting liquid droplet according to the embodiment of the invention, in which FIG. 2A is a side view of the apparatus for ejecting liquid droplet, and FIG. 2B is an enlarged side view around a set table of the work;

FIG. 3 is a plan view around the head plate;

DESCRIPTION OF THE PREFERRED EMBODIMENTS

Referring now to the accompanied drawings, a description will be made about an apparatus for ejecting liquid droplet (also referred to as a liquid droplet ejection apparatus) to which the invention is applied. The liquid droplet ejection apparatus is for manufacturing a flexible board to be built in a compact camera, a mobile phone, and so on, and for forming elements such as a resistance, a coil, or a capacitor (chip part: surface-mounting part) or a metal wiring by discharging functional liquid including a function material dissolved therein on a flexible base film (work) by a fluid eject method using a functional liquid droplet ejection head.

Figure 1:
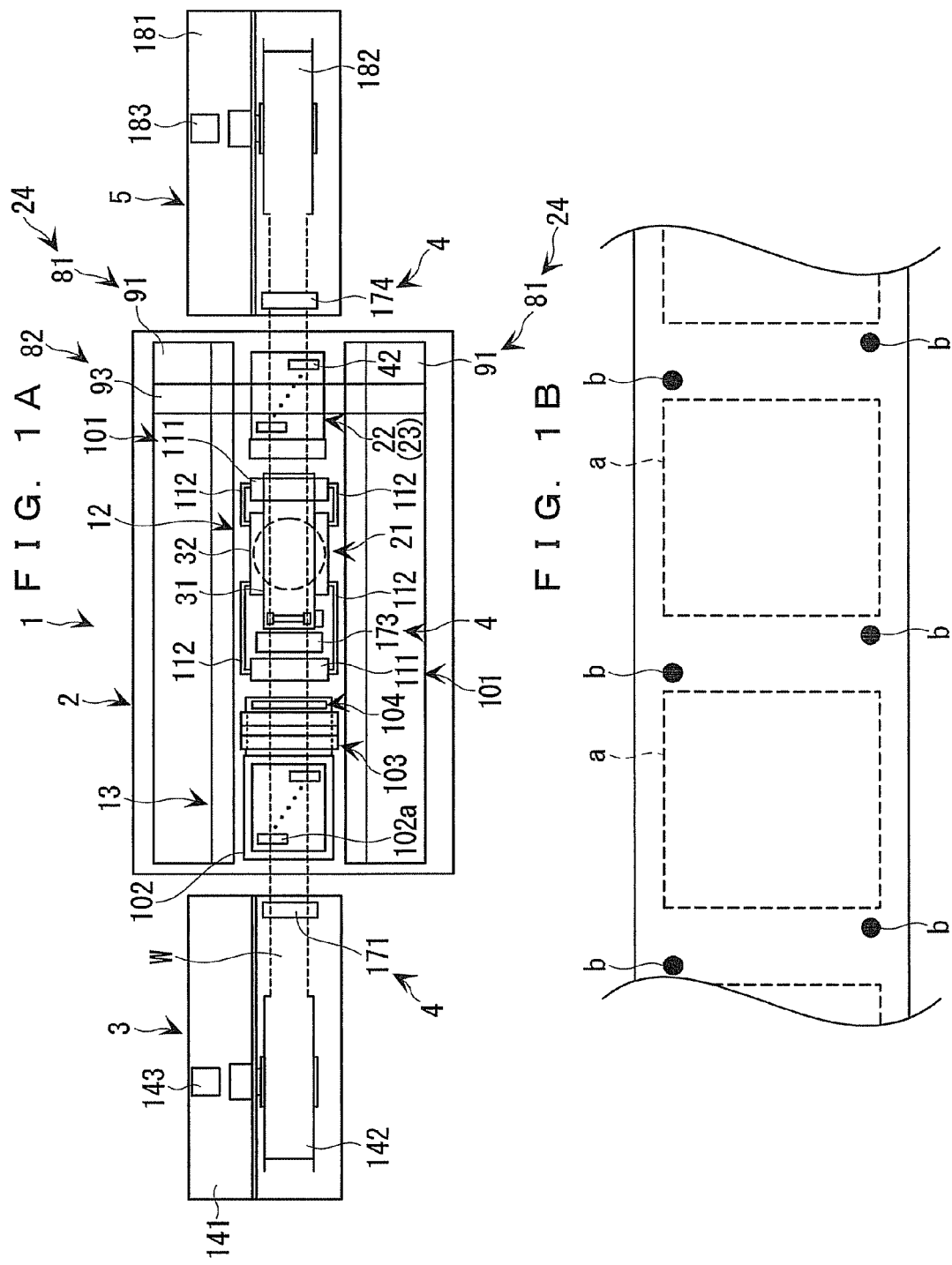
Figure 2:
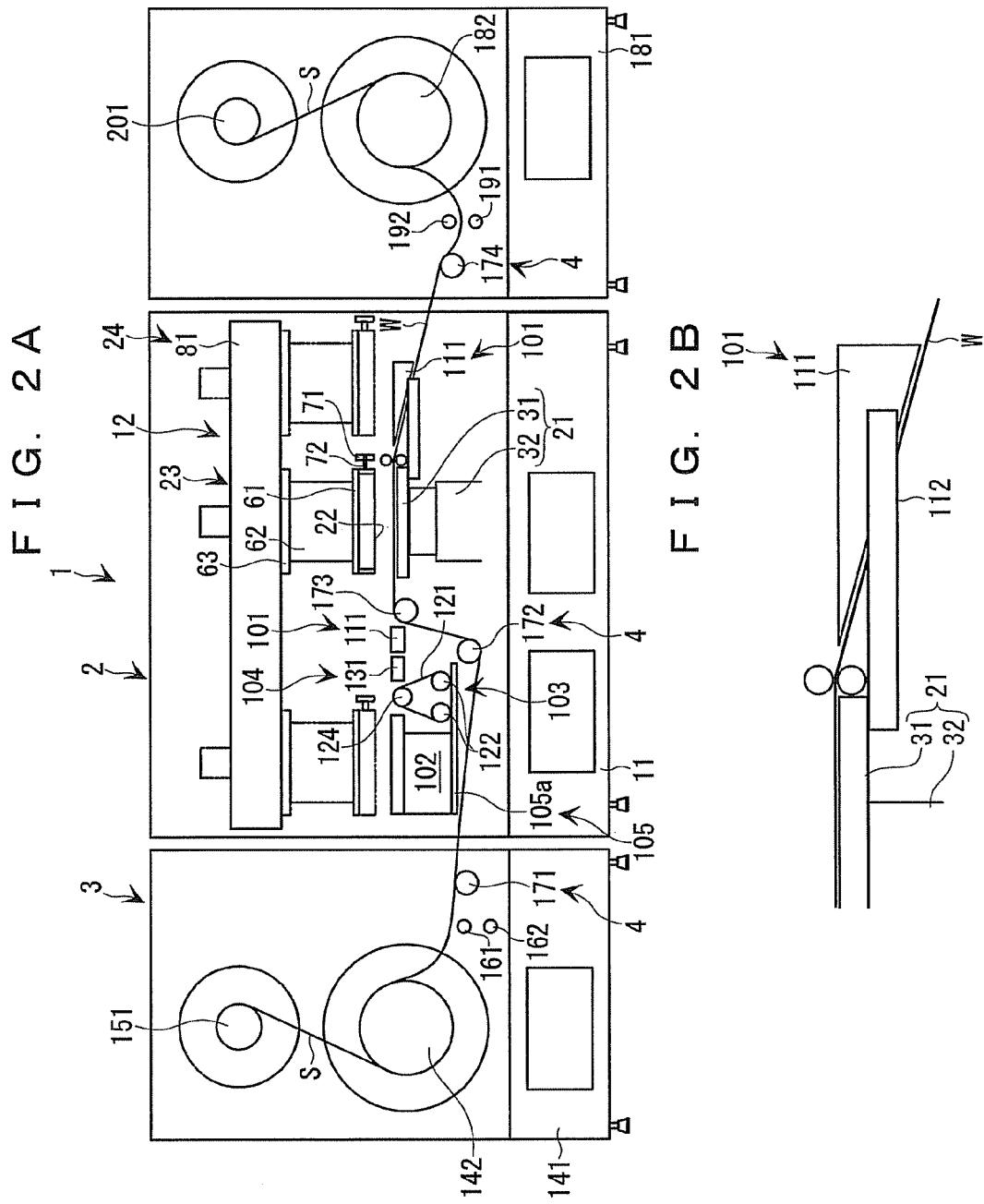

As shown in FIGS. 1A and 2, the liquid droplet ejection apparatus 1 includes functional liquid droplet ejection heads 42, and is provided with: a drawing apparatus 2 for carrying out drawing (picturing) by the functional liquid droplet on the work W; a delivering apparatus 3 for delivering an elongated work W wound into a roll shape; a feeding apparatus 4 for feeding the work W along a predetermined feeding path; and a winding apparatus 5 for winding the work W. In other words, the liquid droplet ejection apparatus 1 carries out the processing in roll-to-roll system, in which the feeding apparatus 4 feeds the work W delivered by the delivering apparatus 3 along the feeding path. Then, after having carried out the drawing process on the work W by the drawing apparatus 2, part of the work W having gone through the processing is fed from the drawing apparatus 2 by the feeding apparatus 4, and simultaneously, the work W having gone through the processing and fed by the feeding apparatus 4 is wound in sequence by the winding apparatus 5. Between the delivering apparatus 3 and the feeding apparatus 4, and between the feeding apparatus 4 and the winding apparatus 5, the work is fed in a sagged state. Although not shown in the drawing, the liquid droplet ejection apparatus 1 is provided with a control apparatus 6 for generally controlling the respective apparatuses, and the above-described series of operations are carried out under the control of the control apparatus 6.

On the other hand, as shown in FIG. 1B, the work W introduced into the liquid droplet ejection apparatus 1 includes a plurality of actual drawing areas "a" on which the predetermined drawing pattern (unit drawing pattern) is drawn provided at predetermined intervals in the longitudinal direction. Then, provided between the actual drawing area "a" and the actual drawing area "a" is a pair of (two) work alignment marks b corresponding to each actual drawing area "a". The pair of work alignment marks b are used for θ-correction of the actual drawing areas "a" which are set to a suction table 31, described later, by suction as well as for data correction in the direction of X and Y axes. The work W is finally cut in area between the respective actual drawing areas "a" formed with the work alignment marks b. Then, a plurality of flexible boards are manufactured by carrying out a predetermined process for each work W which is cut off by each actual drawing area "a".

The work W used in this embodiment includes part of a chip component (or metal wiring) integrated in advance. Therefore, in order to prevent the integrated chip component from getting damaged when the work W is wound, an elongated spacer sheet S with embossing finish is overlapped on the work W. Therefore, the work is wound into a roll-shape with the spacer sheet laminated thereon, and carried in and out.

Subsequently, each unit in the liquid droplet ejection apparatus will be described. As shown in FIG. 1 and FIG. 2, the drawing apparatus 2 includes a machine base 11, a drawing means 12 widely placed on the entire area on the machine base 11 and having a functional liquid droplet ejection heads 42, and a head maintenance unit placed on the machine base 11 so as to be equipped on the drawing means 12.

The drawing means 12 includes a set table 21 for setting the work W introduced into the drawing space by the feeding apparatus 4, a head unit 22 on which a plurality of a functional liquid droplet ejection heads 42 are mounted, a carriage 23 provided with the head unit suspended therefrom, and the X-Y direction movement mechanism for moving the head unit 22 in the X-axis direction and the Y-axis direction in the drawing space via the carriage 23. In the following description, the X-axis direction represents the work W feeding direction (longitudinal direction of the work W), and the Y-axis direction represents the direction horizontally orthogonal to the X-axis direction.

The set table 21 is disposed in the drawing space provided so as to face the feed path of the work W, and includes a suction table 31 for setting the work W by suction, and a θ-table 32 for supporting the suction table 31 so as to be capable of θ-rotation and being supported by the machine base 11. Formed on the suction table 31 (setting surface) are a plurality of suction holes (not shown) for sucking the work W. Although details will be described later, this embodiment is adapted to carry out the drawing process for each actual drawing area, and the suction table 31 is formed into a size on which a single actual drawing area "a" can be set by suction.

Figure 4A:
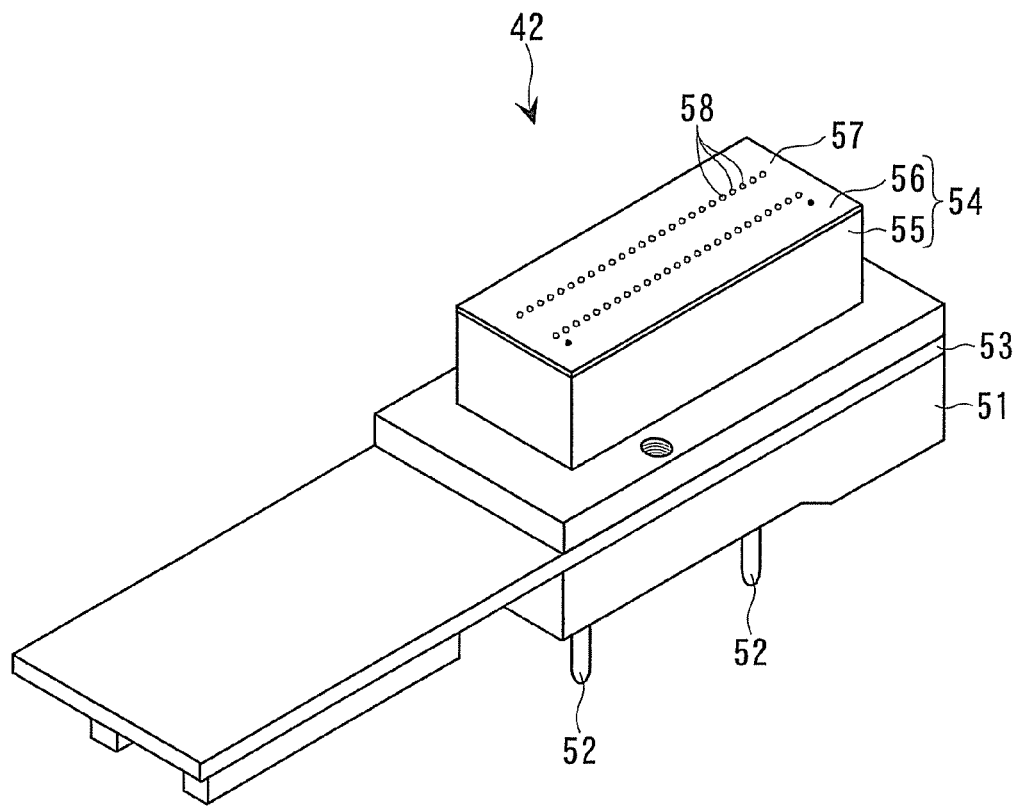
FIG. 4 is an appearance perspective view of a functional liquid droplet ejection heads.
Figure 4B:
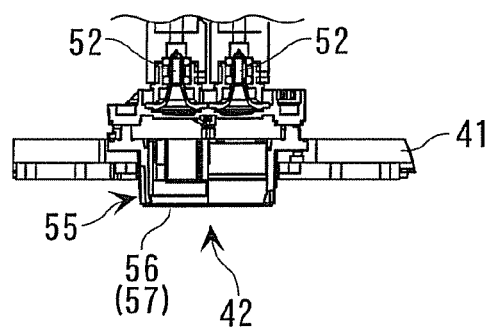

As shown in FIG. 3, the head unit 22 includes a plurality of functional liquid droplet ejection heads 42 mounted on the head plate 41. As shown in FIG. 4, the functional liquid droplet ejection head 42 is of so-called twin type, and includes a functional liquid introduction unit 51 having twin connecting needles 52, a twin head board 53 continuing from the functional liquid introduction unit 51, and a head body 54 continuing downwardly of the functional liquid introduction unit 51 and being formed with a in-head flow path filed with the functional liquid therein. The connecting needle 52 is connected to a functional liquid tank out of the drawing and supplies the functional liquid to the functional liquid introduction unit 51. The head body 54 includes a cavity 55 (piezoelectric element), and a nozzle plate 56 having a nozzle surface 57 having a number of ejection nozzles 58 opening therethrough. When the functional liquid droplet ejection heads 42 are driven for ejection, (a voltage is applied to the piezoelectric element), the functional liquid droplets are ejected from the ejection nozzles 58 by a pumping action of the cavities 55.

The number of ejection nozzles 58 is arranged at uniform pitches (two-dot pitch intervals), whereby two split nozzle rows are formed, and the two sprint nozzle rows are shifted by one-dot pitch with from each other. In other words, the functional liquid droplet ejection head 42 is formed with the nozzle rows at one-dot pitch intervals in the structure of the two split nozzle rows, thereby enabling one-dot pitch (high resolution) drawing.

Arranged on the head plate 41 are the plurality of nozzle rows of the functional liquid droplet ejection heads 42 so as to continue (be partly overlapped) in the Y-axis direction, and one drawing line is formed by the nozzle rows of all the functional liquid droplet ejection heads 42. The length of one drawing lien corresponds to the width of the actual drawing area "a" of the work W described above, so that efficient drawing can be carried out on the work W.

The carriage 23 includes a carriage body 61 for supporting the head unit 22, a θ-rolling mechanism 62 for positional correction (in a horizontal surface) of the head unit 22 in the θ direction, and a substantially I-shaped suspending member 63 for causing the X-Y movement mechanism 24 to support the carriage body 61 (head unit 22).

The carriage body 61 includes a pair (two) of work alignment cameras 71 for photographing the work W (actual drawing area "a") mounted via a camera supporting arm 72. In this embodiment, a pair of work alignment marks b located on one side adjacent to the actual drawing area "a" which is set to the suction table 31 by suction are used as references of alignment. Then, the positional correction of the work W is carried out so that the pair of work alignment marks b as the references come to the predetermined position.

The X-Y movement mechanism 24 includes an X-axis table 81 extending in the X-axis direction, and a Y-axis table 82 supporting the head unit 22 via the carriage 23 so as to be capable of sliding in the Y-axis direction and being configured to be supported by the X-axis table 81 and slidable in the X-axis direction.

The X-axis table 81 includes a pair of X-axis movement mechanisms 91, and the respective X-axis movement mechanisms 91 are extended among a plurality of poles 91 provided so as to extend upright from the machine base 11 and are installed on a pair of supporting bases (not shown) disposed so as to interpose the feed path of the work W therebetween. Although not shown in the drawing, the respective X-axis movement mechanism 91 include an X-axis sliders driven by an X-axis motor, which constitute a drive system in the X-axis direction, and ends of the Y-axis table 82 are slidably supported by the respective X-axis sliders.

The Y-axis table 82 includes a Y-axis motor (not shown) which constitutes a drive system in the Y-axis direction and a Y-axis slider (not shown) driven by a Y-axis motor mounted on the Y-axis supporting plate 93 which is supported at both ends thereof by the pair of X-axis sliders of the X-axis table 81, and the Y-axis slider includes a carriage 23 (suspending member 63) so as to be capable of sliding in the Y-axis direction.

A series of operation at the time of drawing process will be described. The X-axis table 81 is firstly driven to face the carriage 23 (head unit 22) to a predetermined position, and the work W is photographed by a work alignment camera 71. Then, based on the photographed result, the θ-table 32 is driven to carry out the θ-correction of the actual drawing area "a", and data correction is carried out in the X-axis direction and the Y-axis direction.

Subsequently, the X-axis table 81 is driven to move out the head unit 22 in the X-axis direction and synchronously, the functional liquid droplet ejection heads 42 are driven for ejection for causing the functional liquid droplets to be selectively ejected. When the moving out of the head unit 22 is terminated, the Y-axis table 82 is driven and moves the head unit 22 by a predetermined distance in the Y-axis direction. Then, the X-axis table 81 is driven and synchronously, the functional liquid droplet ejection heads 42 are driven for ejection, whereby the head unit 22 is moved back in the X-axis direction and the functional liquid droplets are selectively ejected on the work W. In the drawing process, by repeating the movement of the head unit 22 in the X-axis direction, the driving of the functional liquid droplet ejection heads 42 for ejection (horizontal scanning), and the movement of the head unit 22 in the Y-axis direction (vertical scanning) alternatively, the functional liquid droplet ejection heads 42 move in the drawing space, and unit drawing patterns are drawn in the actual drawing areas "a" of the work W set on the suction table 31. The action from starting of the drawing process to terminating the drawing of the unit drawing pattern on one actual drawing area "a" is referred to as "one tact".

Subsequently, a head maintenance means will be described. The head maintenance means 13 is for maintaining and restoring the function of the functional liquid droplet ejection heads 42, and includes flushing units 101, a suction unit 102, a wiping unit 103, and an ejection failure inspection unit 104. These units are arranged so as to face the movement track of the head unit 22, so that the maintenance operation is carried out for the functional liquid droplet ejection heads 42 mounted on the head unit 22 from below.

As shown in FIG. 2, the suction unit 102, the wiping unit 103, and the ejection failure inspection unit 104 are installed on a common supporting stand 105 standing on the machine base 11. The common supporting stand 105 includes a common supporting plate 105a for supporting the suction unit 102, the wiping unit 103, and the ejection failure inspection unit 104, and pole members (not shown) for arranging in line in the Y-axis direction and supporting both ends of the common supporting plate 105a. A gap is defined between the machine base 11 and the common supporting plate 105a, and the work W is delivered through the gap to the suction table 31 (see FIG. 2A).

The flushing units 101, which are used for receiving the functional liquid droplet ejected from all the ejection nozzles 58 of the functional liquid droplet ejection heads 42 by waste ejection (flushing), are arranged in the above-described drawing spaces, and include a pair of flushing boxes 111 for receiving the functional liquid and a pair of box supporting members 112 for making the suction table 31 (or θ-table 32) support each of the pair of flushing boxes 111.

The respective flushing boxes 111 are formed into an elongated box-shape having a rectangular plan view, and an absorbing member (not shown) for absorbing the functional liquid is bedded on the bottom thereof. Although details are described later, the work W fed by the feeding apparatus 4 is adapted to be fed in a state of being sagged downwardly with the intermediary of the front and rear of the suction table 31, and the respective flushing boxes 111 are arranged at these sagged portions near the suction table 31 (see FIG. 2). The respective flushing boxes 111 are formed into a shape similar to the sagged shape of the work W arranged on the side of the suction table 31. Therefore, the bottom portions of the respective flushing boxes 111 do not interfere with the work W, and the respective flushing boxes 111 are arranged near the suction table 31. Although the part of the work W located on the winding apparatus 5 side with respect to the suction table 31 cannot be sagged significantly in order to avoid dripping off of the functional liquid after drawing, by forming the flushing boxes 111 to have a shape in side view corresponding to the sag of the work W as in this embodiment, the flushing boxes 111 can be disposed in relatively small space (sagged portion). The shape of sag of the work W is different between the side of the delivering apparatus 3 and the side of the winding apparatus 5 with respect to the suction table 31, and hence the respective flushing boxes have different shapes in side view, respectively (see FIG. 2).

The respective supporting box 112 support the flushing boxes 111 so as to overhung from the suction table 31 so that the respective flushing boxes 111 are located at the sagged portions of the work W with the upper end surfaces thereof flush with a set surface of the suction table 31, and so that the respective plashing boxes 111 extend along a pair of sides (peripheral edge) extending in the Y-axis direction of the suction table 31 (on the outside of the work W) (see FIG. 1 and FIG. 2). Since the respective box supporting members 112 support the respective flushing boxes 111 on the θ-table 32, when the suction table 31 is θ-corrected and rotated, the respective flushing boxes are θ-rotated together.

In this embodiment, an area including the suction table 31 and the pair of flushing boxes 111 disposed so as to interpose the same is set as a drawing space, and when the work W is reciprocated in the X-axis direction for drawing process, the functional liquid droplet ejection heads 42 of the head unit 22 face the flushing boxes 111 in sequence immediately before facing the work W for carrying out flushing (pre-drawing flushing).

In this embodiment, although the pair of flushing boxes 111 are provided so as to interpose the suction table 31, it is also possible to provide only one of those. When providing the flushing box at the sagged portion on the delivering apparatus 3 side, it may be installed on the above-described common supporting frame 105.

As shown in FIG. 1 and FIG. 2, the suction unit 102 is for forcing the functional liquid to be ejected from the ejection nozzles 58, and includes a plurality of caps (not shown) for coming into hermetical contact with the nozzle surfaces 57 of the functional liquid droplet ejection heads 42, a cap driving mechanism (not shown) for bringing the caps into and out of contact with the functional liquid droplet ejection heads 42 (nozzle surfaces 57), and a single suction unit which can suck the functional liquid droplet ejection heads 42 (ejector or suction pump). Suction of the functional liquid is carried out for resolving/preventing clogging of the functional liquid droplet ejection heads 42 as well as for filling the functional liquid in the functional liquid flow path extending from the functional liquid feed mechanism to the functional liquid droplet ejection heads 42 when the liquid droplet ejection apparatus 1 is newly provided, or when replacing the heads of the functional liquid droplet ejection heads 42.

The caps also have a function of (regular) flushing boxes for receiving functional liquid ejected by waste ejection (regular flushing) of the functional liquid droplet ejection heads 42 carried out when the drawing process with respect to the work W is temporarily stopped, such as the time of delivering the work W. Then, when one tact of the drawing process is terminated, the head unit 22 moves to a position above the head unit 22 so that the regular flushing is carried out. Accordingly, clogging of the functional liquid droplet ejection heads 42 during delivery of the work can be prevented effectively. In this case, the caps can be moved from the nozzle surfaces 57 of the functional liquid droplet ejection heads 42 to a position at which the upper surfaces thereof are slightly apart from the nozzle surfaces 57 of the functional liquid droplet ejection heads 42.

The caps are also used for storing the functional liquid droplet ejection heads 42 when the liquid droplet ejection apparatus 1 is not in operation. In this case, the nozzle surfaces 57 are sealed to prevent the functional liquid droplet ejection heads 42 (ejection nozzle 58) from drying by facing the head unit 22 to the suction unit 102, and bringing the caps into tight contact with the nozzle surfaces 57 of the functional liquid droplet ejection heads 42.

The wiping unit 103 is used for wiping off (for carrying out wiping operation) the nozzle surface 57 of the functional liquid droplet ejection heads 42 by a wiping sheet 121 on which cleaning fluid is sprayed, and includes a winding apparatus 122 for delivering and winding the wiping sheet 121 wound into a roll shape and a cleaning fluid feed unit (not shown) for spraying the cleaning fluid on the delivered wiping sheet 121, and a wiping unit 124 for wiping the nozzle surfaces 57 with the wiping sheet 121 on which the cleaning fluid is sprayed.

The wiping operation with respect to the functional liquid droplet ejection heads 42 is carried out after having sucked the functional liquid droplet ejection heads 42 by the suction unit 102, whereby dirt attached to the nozzle surfaces 57 is wiped off. The wiping unit 103 is installed between the suction table 31 and the suction unit 102 in the X-axis direction, so as to face the functional liquid droplet ejection heads 42 which moves to the drawing space for drawing process after the suction by the suction unit 102, and carry out the wiping operation efficiently (see FIG. 1 and FIG. 2).

The ejection failure inspection unit 104 is for inspecting whether or not the functional liquid is properly ejected from (the ejection nozzles 58 of) all the functional liquid droplet ejection heads 42 mounted on the head unit 22, and includes a drawn unit 131 for receiving the functional liquid ejected from all the ejection nozzles 58 of all the functional liquid droplet ejection heads 42 mounted on the head unit 22 and causing a predetermined inspection pattern to be drawn thereon, and a image pickup unit (not shown) for photographing the inspection pattern drawn on the drawn unit 131. The result of photographing the inspection pattern photographed by the image pickup unit is sent to the control apparatus 6 and recognized as the image and, based on the image recognition, a determination is made as to whether or not the respective discharging nozzles 58 of the respective functional liquid droplet ejection heads 42 eject the functional liquid normally.

The ejection failure inspection unit 104 is also installed between the suction table 31 and the suction unit 102 (see FIG. 1 and FIG. 2). Therefore, the ejection failure inspection unit 104 faces the head unit 22 which is moving to the suction table 31 for regular flushing and carries out the ejection failure inspection, and hence ejection failure of the functional liquid droplet ejection heads 42 can be inspected efficiently (without daring to move the head unit 22).

Subsequently, the delivering apparatus 3, the feeding apparatus 4, and the winding apparatus are described in sequence. As shown in FIG. 1 and FIG. 2, the delivering apparatus 3, being installed on the delivering apparatus base 141 accompanied to the upstream side of the machine base 11, is rotatably journaled by a delivery supporting frame and includes a delivery reel 142 on which the rolled work W is mounted, and a delivery motor 143 for rotating the delivery reel 142 in the normal and reverse direction. When the delivery motor 143 is driven in the normal direction to rotate the delivery motor 143 in the normal direction, the work W is delivered to the feeding apparatus 4 from the delivery reel 142.

Provided on the delivery machine base 141 above the delivery reel 142 is a spacer winding reel 151 for winding a spacer sheet S wound around the delivery reel 142. The spacer winding reel 151 is adapted to wind the spacer sheet S synchronously with the delivery of the work W from the delivery reel 142 so that only the work W is fed to the feeding apparatus 4. It is also possible to use the delivery motor 143 as the drive source of the spacer winding reel 151.

Delivery of the work W is carried out in parallel with the drawing process described above, and the work W is delivered at the time of drawing process by at least a length corresponding to the length of the actual drawing area "a" in the X-axis direction, that is, by a length of feeding of the work W which is sent for the next drawing process (the length corresponding to one tact). In this case, the delivered work W is sagged between the delivery reel 142 and the feeding apparatus 4 (delivery-side feeding roller 171: described later). In other words, a space between the delivery reel 142 and the delivery-side feed roller 171 corresponds to a buffer area (space) for the work W. Then, in this embodiment, a delivery amount detection sensor 161 for detecting the delivery amount of the work W by detecting the position of the lower end of the sag on the delivery side in this buffer area is provided, whereby driving of the delivery motor 143 is controlled based on the detected result of the delivery amount detection sensor 161. More specifically, the delivery amount detection sensor 161 is arranged at a position corresponding to the position of the lower end of the sag on the delivery side generated when the work W is delivered by the amount corresponding to one take and, when the delivery amount detection sensor 161 detects the position of the lower end of the sag on the delivery side, driving of the delivery motor 143 is stopped. In this manner, in this embodiment, since the delivery motor 143 is controlled based on the sagged amount of the sag of the work W on the side of the delivery side, delivery of the work W (by the predetermined amount) can be carried out without being affected by the diameter of the roll on the delivery reel 142.

Since the chip components or the like which is built in the work W in advance may be destroyed when the work W is sagged, the distance between the delivery reel 142 and the delivery-side feed roller 171 is set so that the sag on the delivery side does not exceed a predetermined curvature R1, and the delivery-side lower-limit sensor 162 for detecting the position of the lower limit of the lower end of the sag on the delivery side is provided.

As shown in FIG. 1 and FIG. 2, the feeding apparatus 4 is disposed on the delivery machine base 141, and includes a delivery-side feed roller 171 for receiving the work W delivered from the delivery reel 142, a first route change roller 172 for changing the route of the work W fed from the delivery-side feed roller 171 to pass under the common supporting stand 105 (under the common supporting plate 105a), a second route change roller 173 for changing the route of the work W again so that the work W changed in route by the first route change roller 172 is fed horizontally to the suction table 31, a winding-side feed roller 174 disposed on a winding machine base 181 (described later) on which the winding apparatus 5 is installed for sending the work having finished the drawing to the winding apparatus 5 (winding reel 182: described later), and a winding-side feed motor (not shown) for rotating the winding-side feed roller 174 in the normal and reverse directions. The winding-side feed motor is composed of a servo motor or a stepping motor with an encoder, and the amount of delivered work W is obtained from the amount of rotation thereof by the control apparatus 6.

One of the pair of above-described flushing boxes 111 is disposed at an upwardly inclined portion of the work W which is changed in route and fed by the second route change roller 173 and the other flushing box 111 is disposed at an inclined portion of the work W fed obliquely downward from the suction table 31. Since the pattern of the functional liquid is already drawn on the work delivered obliquely downward from the suction table 31 by the drawing process, the angle of inclination is set to an angle which avoids dripping off of the functional liquid which is already drawn on the work W due to the inclination. The winding-side feed motor is composed of the servo motor or the stepping motor with the encoder, and the amount of delivered work W is obtained from the amount of rotation thereof by the control apparatus 6.

The feed of the work W by the feeding apparatus 4 is carried out after having finished the drawing process by one tact, and when the one tact of the drawing process is terminated, the winding feed motor is driven. Accordingly, the winding-side feed roller 174 as the drive roller rotates, and the delivery-side feed roller 171, the first route changing roller 172, and the second route changing roller 173 as driven rollers are rotated. Then, the work feed by the amount corresponding to one tact is carried out, and the work with the pattern already drawn thereon is fed from the set table, and simultaneously, a new portion (actual drawing area "a") is fed. As described above, since the work W by the amount corresponding to one tact is already delivered before starting feeding of the work W in this embodiment, the feeding of the work W can be carried out quickly with high degree of accuracy without being affected by the delivery of the work W by the delivery unit 3.

As shown in FIG. 1 and FIG. 2, the winding apparatus 5 is installed on the winding machine base 181 accompanied on the downstream side of the machine base 11, and includes a winding reel 182 rotatably journaled on the winding support frame, not shown, for winding the work fed from a work feeding unit 213 with the pattern already drawn thereon, and a winding motor 183 for rotating the winding reel 182 in the normal and reverse direction. When the winding motor 183 is driven in the normal direction to rotate the winding reel 182 in the normal direction, the work W from the winding-side feed roller 174 is wound on the winding reel 182.

The winding operation of the work W is carried out in parallel with the drawing process as in the case of the work delivering operation. The work W fed (by the amount corresponding to one tack) from the feeding apparatus 4 (winding-side feed roller 174) is fed to the winding apparatus 5 side once in the sagged state. Then, when the feeding of the work is terminated, and the drawing process is started, the winding motor 183 is driven, and the sagged work W is sound on the winding reel 182. In this case, control of the winding motor 183 is also achieved by detecting the sag (sag on the winding side). More specifically, a winding-amount detection sensor 191 is arranged at a position corresponding to the position of the lower end of the sag on the winding side when the work W of an amount corresponding to one take is wound and, when the winding-amount detection sensor 191 detects the position of the lower end of the sag on the winding side, the driving of the winding motor 182 is stopped. The feeding apparatus 4 is provided with a winding-side upper-limit sensor 192 for detecting the position of the upper limit of the position of the lower end of the sag on the winding side in order to detect excessive winding of the work W.

Reference numeral 201 shown in the same drawing designates a spacer feed reel for feeding the spacer sheet S, and feeds the spacer sheet S on the work W with the pattern drawn thereon to be wound. The fed spacer sheet S is wound around the winding reel 182 with the work W, and prevents the chip components formed on the work W or the elements or the like formed already thereon from being destroyed by the drawing process.

The work receiving means recited in claims includes part of the feeding apparatus 4 (winding-side feed roller 174, winding-side feed motor), and the winding apparatus 5. While this embodiment employs a structure in which the work W with the pattern drawn thereon fed delivered from the suction table 31 by the winding-side feed roller 174 is wound into a roll shape by the winding apparatus, when the process with a separate unit is to be performed continuously, winding of the work W with the pattern drawn thereon is delivered to the separate unit as is without carrying out the winding operation.

Figure 5:
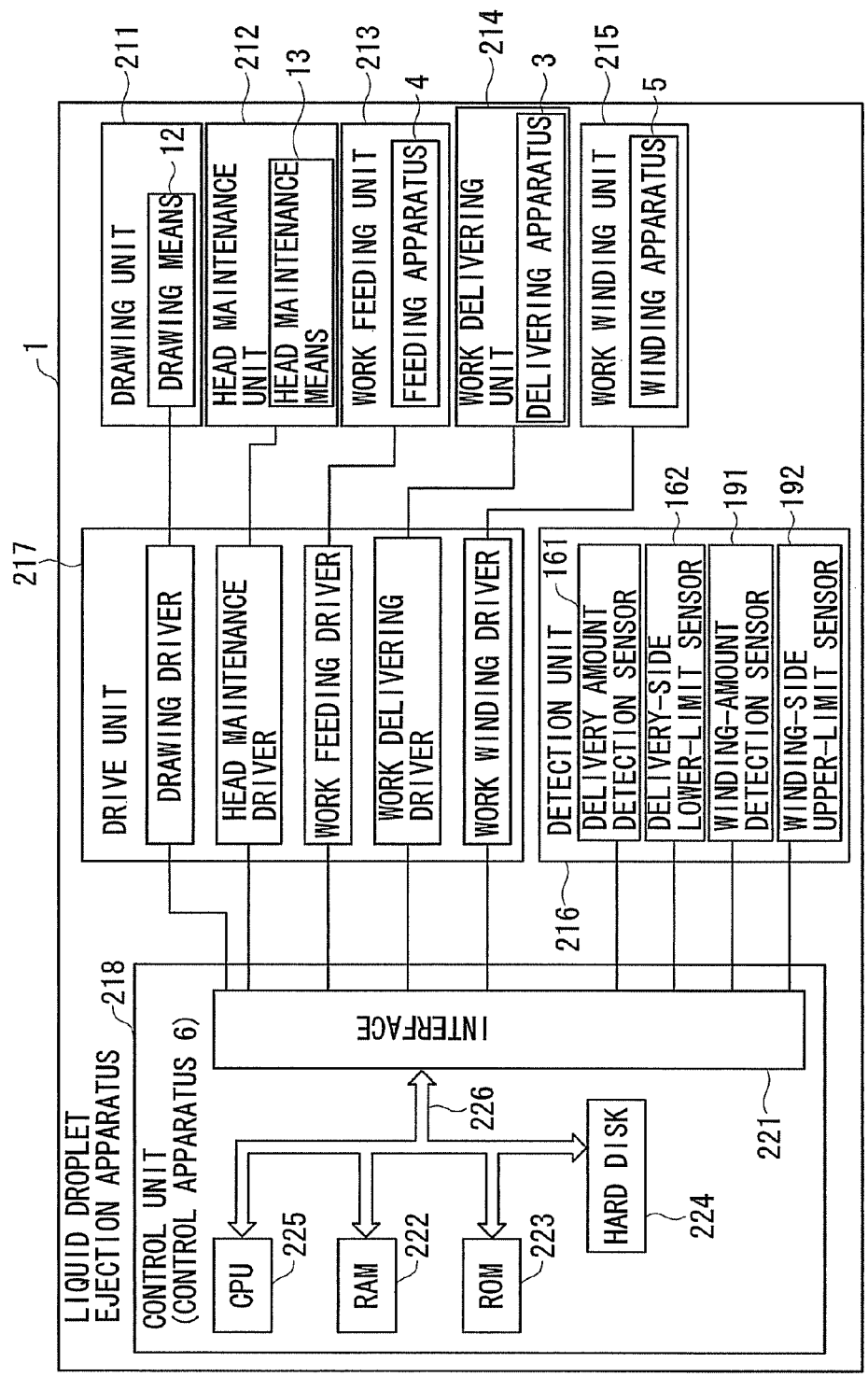
FIG. 5 is a block diagram illustrating a main control system of the apparatus for ejecting liquid droplet.
Figure 6:
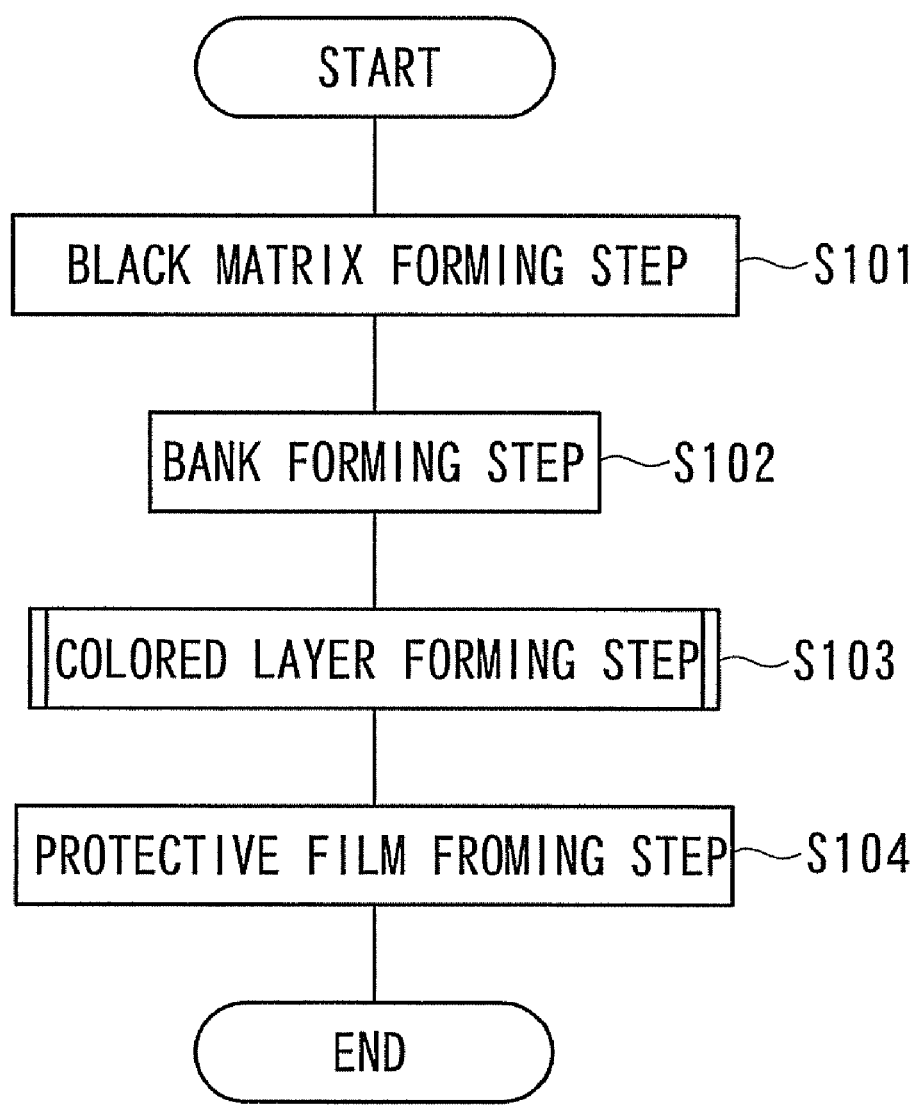
FIG. 6 is a flowchart showing manufacturing steps of a color filter.

Referring now to FIG. 5, a main control system of the liquid droplet ejection unit 1 will be described. The liquid drop ejection unit 1 includes a drawing unit 211 having the drawing means 12, a head maintenance unit 212 having the head maintenance means 13, a work delivering unit 214 having the delivering apparatus 4, a work winding unit 215 having the winding apparatus 5, a detection unit 216 having various sensors of the respective units (the delivery amount detection sensor 161, the delivery-side lower-limit sensor 162, the winding-amount detection sensor 191, the winding-side upper-limit sensor 192, and so on) for carrying out various types of detection, a drive unit 217 having the various drivers for driving the respective sections, and a control unit 218 (control apparatus 6) connected to the respective sections for controlling the entire liquid droplet ejection unit 1.

The control unit 218 includes an interface 221 for connecting the respective sections, a RAM 222 having a storage area capable of storing temporarily and being used as a working area for control process, a ROM 223 having various storage areas for storing control program or the control data, a hard disk 224 for storing drawing data for drawing the pattern on the work W or various data from the respective units as well as program or the like for processing the various data, a CPU 225 for calculating the various data according to the program or the like store in the ROM 223 or the hard disk 224, and a bus 226 for connecting these members with respect to each other.

The control unit 218 inputs the various data sent from the respective units via the interface 221 and make the CPU 225 calculates according to the program stored in the hard disk 224 (or read from the external input unit such as the CD-ROM drive or the like), and then outputs the processed result to the respective units via the interface 221. Accordingly, the respective units are totally controlled whereby a series of processes with respect to the work described above is carried out.

As described thus far, according to the liquid droplet ejection apparatus 1 according to this embodiment, since the work W is sagged upstream and downstream of the suction table 31 in the X-axis direction, which is the direction of delivery of the work W, and the flushing boxes 111 are arranged at the sagged portions, all the functional liquid droplet ejection heads 42 mounted on the head unit 22 is caused to carry out the pre-drawing flushing at the time of drawing process, whereby stable drawing on the actual drawing areas "a" on the work W is achieved.

While the liquid droplet ejection unit of the invention can be used for forming an element such as a resistance, a coil, or a capacitor, or a metal wiring, the process for forming these members are to be carried out independently. By introducing the specific functional liquid which meets the object to each of a plurality of the liquid droplet ejection apparatuses corresponding to the respective processes and introducing the work into the fluid drop discharging devices corresponding to the respective processes in a predetermined order for making them to draw the pattern thereon, these elements and wiring are formed on the work W in sequence.

Exemplifying now a color filter, a liquid crystal display device, an organic EL device, a plasma display (PDP device), an electron-emitting device (FED device, SED device) as the electro-optical device (flat panel display) manufactured using the liquid droplet ejection apparatus 1 according to this embodiment, and also an active matrix board or the like formed in these display devices, the structures thereof and the method of manufacturing the same will be described. The active matrix board represents a board formed with a thin-film transistor and a source wiring and data wiring to be electrically connected to the thin-film transistor.

Figure 12:
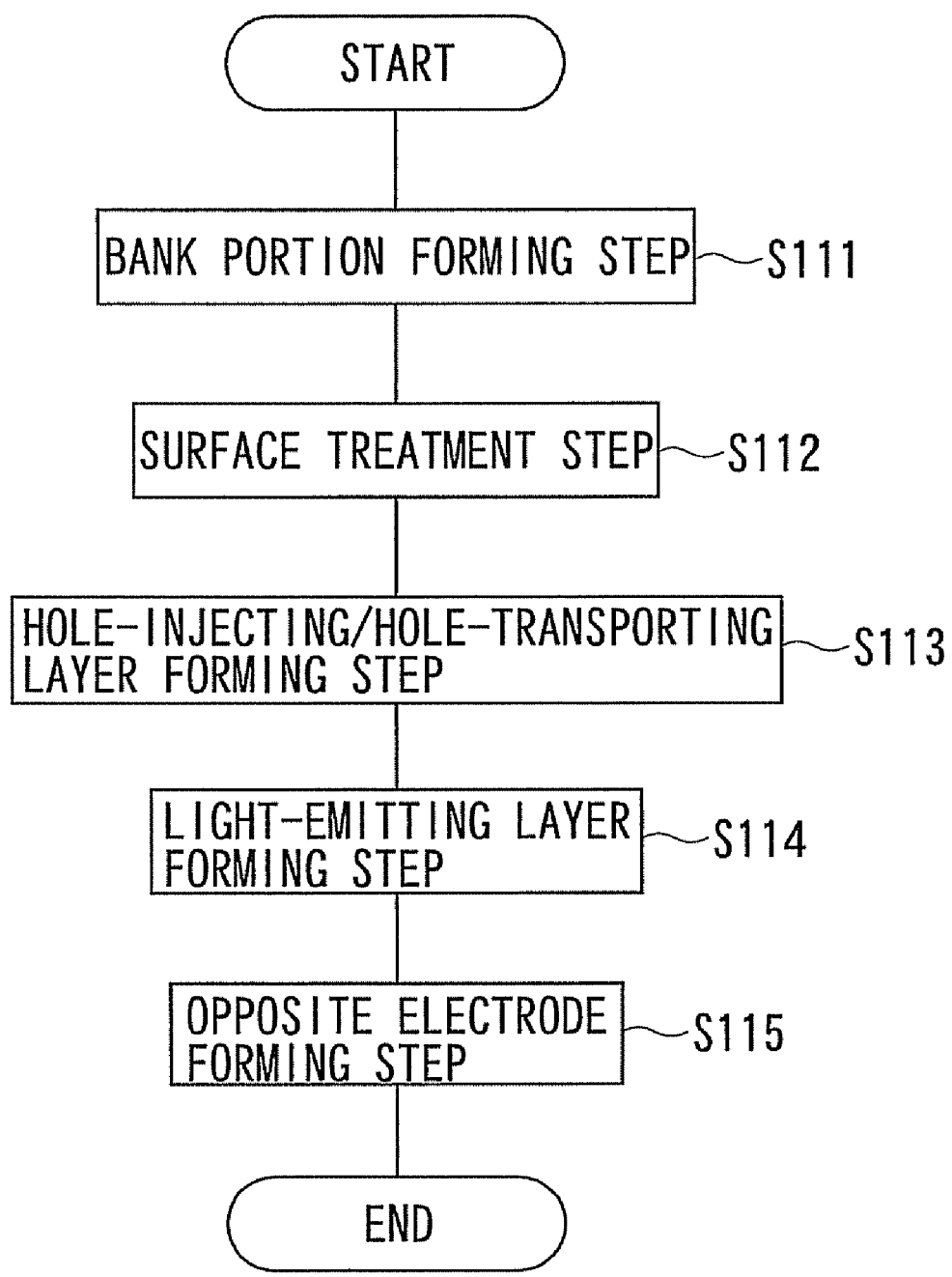
FIG. 12 is a flowchart showing manufacturing processes of the display device as the organic EL device.

A method of manufacturing the color filter to be built in the liquid crystal display device or the organic EL device will be described now. FIG. 12 is a flowchart showing the process of manufacturing the color filter, FIG. 7 is a pattern cross-section of a color filter 600 (filter base substrate 600A) in this embodiment shown in the sequence of the manufacturing process.

Figure 7A:
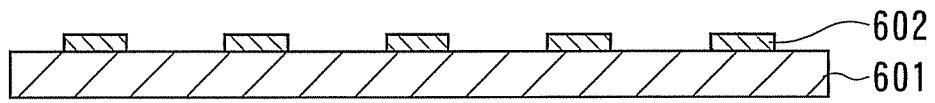
FIG. 7A to FIG. 7E are cross-sectional sketch of the color filter shown in the order of the manufacturing steps.

Firstly, in a black matrix forming step (S101), as shown in FIG. 7A, a black matrix 602 is formed on the substrate (W) 601. The black matrix 602 is formed of chromium metal, a layered member of chromium metal and chrome oxide, resin black, and so on. In order to form the black matrix 602 formed of a metal thin film, a sputtering process, an evaporating method, and the like can be employed. In order to form a black matrix 602 formed of resin thin film, a gravure printing method, a photoresist method, a thermal-transfer method, and so on may be employed.

Figure 7B:
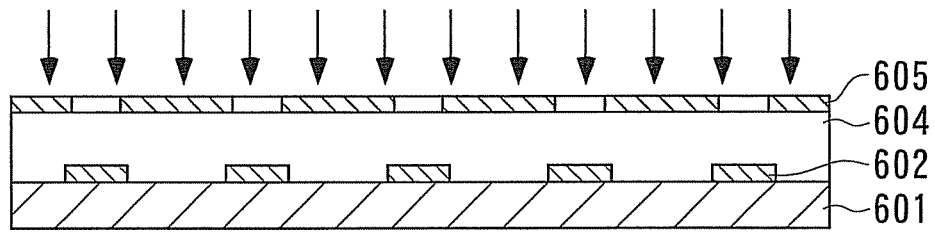

Subsequently, in a bank forming process (S102), a bank 603 is formed in a state of being overlapped on the black matrix 602. In other words, as shown in FIG. 7B, a resist layer 604 formed of a transparent photo-sensitive resin of a negative type is formed so as to cover the substrate 601 and the black matrix 602. Then, an exposure process is carried out in a state in which the upper surface thereof is coated with a mask film 605 formed into the matrix pattern shape.

Figure 7C:
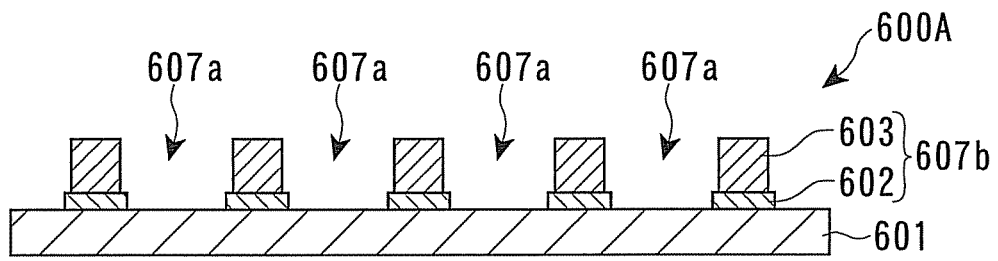

Then, as shown in FIG. 7C, patterning is carried out on the resist layer 604 by etching the unexposed portion thereof to form a bank 603. When the black matrix is formed by the resin black, the black matrix can also be used as the bank.

The bank 603 and the black matrix 602 below the bank 603 serves as a partitioning wall portion 607b for partitioning respective pixel areas 607a and defines receiving areas for receiving the functional liquid droplets when forming the colored layer (film formed portions) 608R, 608G, 608B by the functional liquid droplet ejection heads 402 in the colored layer forming process coming later.

By performing the above-described black matrix forming step and the bank forming step, the above-described filter base substrate 600A is obtained.

In this embodiment, a resin material which provides the coated layer with lyophobic (hydrophobic) property is used as a material of the bank 603. Since the surface of the substrate (glass substrate) 601 has a lyophilic (hydrophilic) property, positional accuracy when receiving the fluid drops into the respective pixel areas 607a surrounded by the bank 603 (partitioning wall portion 607b) in the colored layer forming step, described later is improved.

Figure 7D:
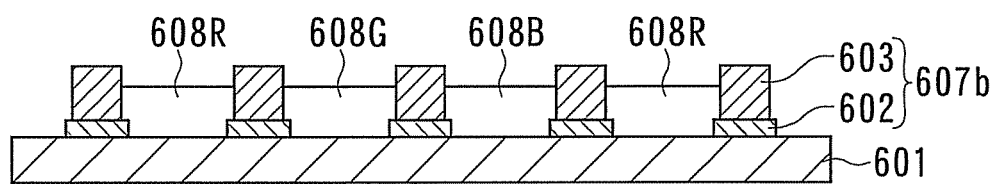

Subsequently, in the colored layer forming step (S103), as shown in FIG. 7D, the functional liquid drops are ejected from the functional liquid droplet ejection heads 42 and received in the respective pixel areas 607a surrounded by the partitioning wall portion 607b. In this case, the functional liquid (filter material) of three colors of R, G and B is introduced using the functional liquid droplet ejection heads 42 to carry out ejection of the functional liquid droplets. The array patterns of R, G, and B include a stripe array, a mosaic array, and delta array.

Figure 7E:
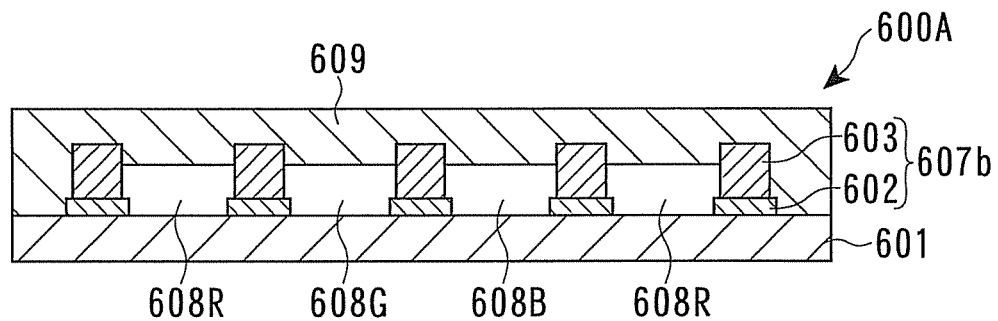

Subsequently, the functional liquid is fixed by the drying process (process such as heating), and the colored layers of three colors 608R, 608G, and 608B are formed. After having formed the colored layers 608R, 608G, and 608B, the procedure goes to the protective film forming step (S104) and, as shown in FIG. 7E, the protective film 609 is formed so as to coat the upper surfaces of the substrate 601, the partitioning wall portion 607b and the colored layers 608R, 608G, 608B.

In other words, after application liquid for protective film has applied on the entire surface of the substrate 601 on which the colored layers 608R, 608G, and 608B are formed, and the substrate goes through the drying step, whereby the protective film 609 is formed.

After having formed the protective film 609, the color filter proceeds to a subsequent film attaching step of ITO (Indium Tin Oxide) as a transparent electrode.

Figure 8:
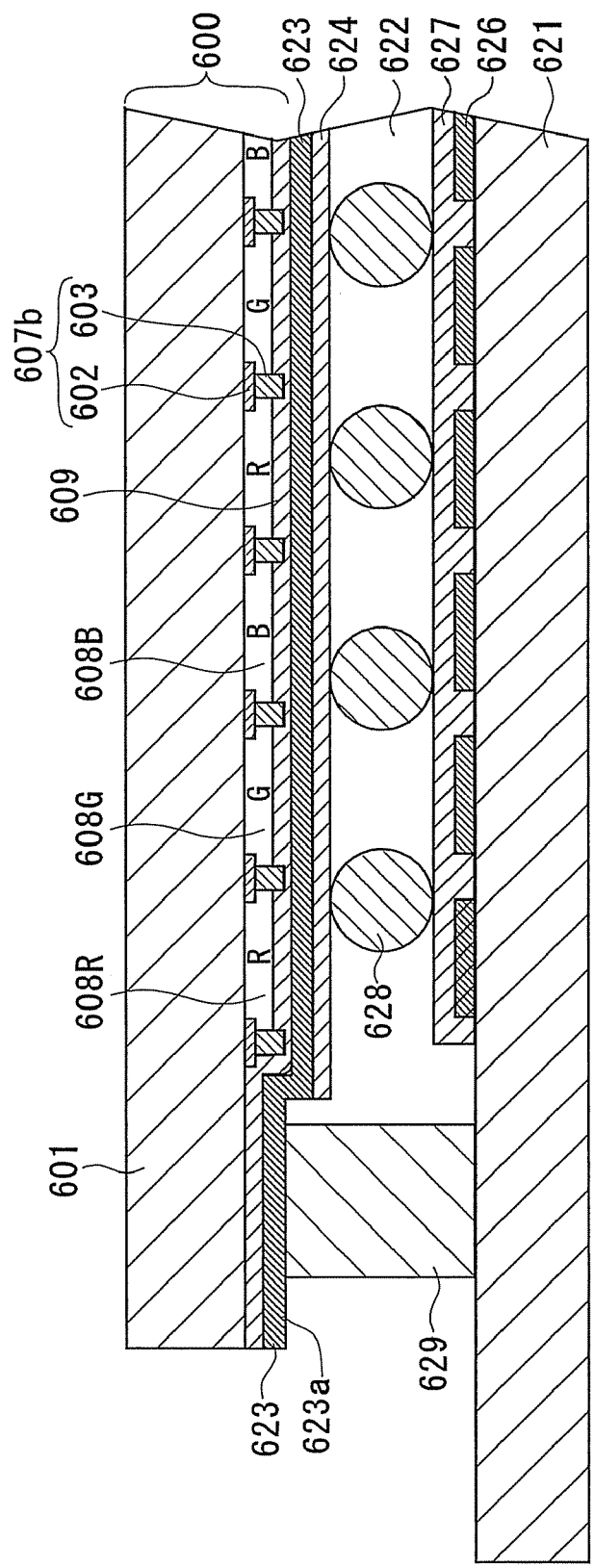
FIG. 8 is a cross-sectional view of a principal portion showing a schematic structure of a liquid crystal device using the color filter to which the invention is applied.

FIG. 8 is a cross-sectional view showing a schematic structure of a passive matrix type liquid crystal device (liquid crystal device) as an example of the liquid crystal display device employing the above-described color filter 600. A transmissive liquid crystal display device as a final product is obtained by mounting the additional elements such as an IC for driving the liquid crystal, a back light, and the supporting member to the liquid crystal device 620. Since the color filter 600 is the same as the one shown in FIG. 7, corresponding parts are represented by the same reference numerals and description will be omitted.

The liquid crystal device 620 is schematically composed of the color filter 600, an opposing substrate 621 formed of a glass substrate or the like, and a liquid crystal layer 622 formed of STN (Super Twisted Nematic) liquid crystal composition interposed therebetween, and the color filter is arranged on the upper side in the drawing (viewer side).

Although not shown in the drawing, deflecting plates are disposed respectively on the outer surfaces (surfaces on the opposite side from the liquid crystal layer 622) of the opposing substrate 621 and the color filter 600, and a back light is disposed on the outer side of the deflecting plate located on the opposing substrate 621 side.

Formed on the protective film 609 (liquid crystal layer side) of the color filter 600 are a plurality of first electrodes 623 of a rectangular shape elongated in the lateral direction in FIG. 8 at predetermined intervals, and a first orientation layer 624 is formed so as to cover the surfaces of the first electrodes 623 on the opposite side from the color filter 600.

On the other hand, formed on the surface of the opposing substrate 621 opposing to the color filter 600 are a plurality of second electrodes 626 of a rectangular shape elongated in the direction orthogonal to the first electrodes 623 of the color filter 600 at predetermined intervals, and a second orientation layer 627 is formed so as to cover the surfaces of the second electrodes 626 on the liquid crystal layer 622 side. The first electrodes 623 and the second electrodes 626 are formed of transparent conductive material such as ITO.

Spacers 628 provided in the liquid crystal layer 622 are members for maintaining the thickness (cell gap) of the liquid crystal layer 622 uniform. A sealing member 629 is a member for preventing liquid crystal component in the liquid crystal layer 622 from leaking outside. One end of each first electrode 623 extends to the outside of the sealing member 629 as an extension wiring 623a.

Then, the portions where the first electrodes 623 intersect with the second electrodes 626 are pixels, and it is adapted in such a manner that the colored layers 608R, 608G, 608B of the color filter 600 are located at the portions corresponding to the pixels.

In the normal manufacturing process, patterning of the first electrodes 623 and application of the first orientation layer on the color filter 600 is carried out to form the portion on the color filter 600 side, and separately, patterning of the second electrodes 626 and application of the second orientation layer 627 is carried out to form the portion on the opposing substrate 621 side. Subsequently, the spacer 628 and the sealing member 629 are formed in the portion on the opposing substrate 621 side and, in this state, the portion of the color filter 600 side is adhered. Subsequently, liquid crystal which constitutes the liquid crystal layer 622 is filled from an inlet port of the sealing member 629 and the inlet port is closed. Then, the both deflecting plates and the back light are layered.

According to the liquid droplet ejection apparatus 1 of the embodiment, for example, it is possible to apply the spacer material (functional liquid) which constitutes a cell gap described above and apply the liquid crystal (functional liquid) uniformly in the area surrounded by the sealing member 629 before adhering the portion on the color filter 600 side to the portion on the opposing substrate 621 side. It is also possible to perform printing of the sealing member 629 by the functional liquid droplet ejection heads 42. Furthermore, it is also possible to apply the both first and second orientation layers 624, 627 by the functional liquid droplet ejection heads 42.

Figure 9:
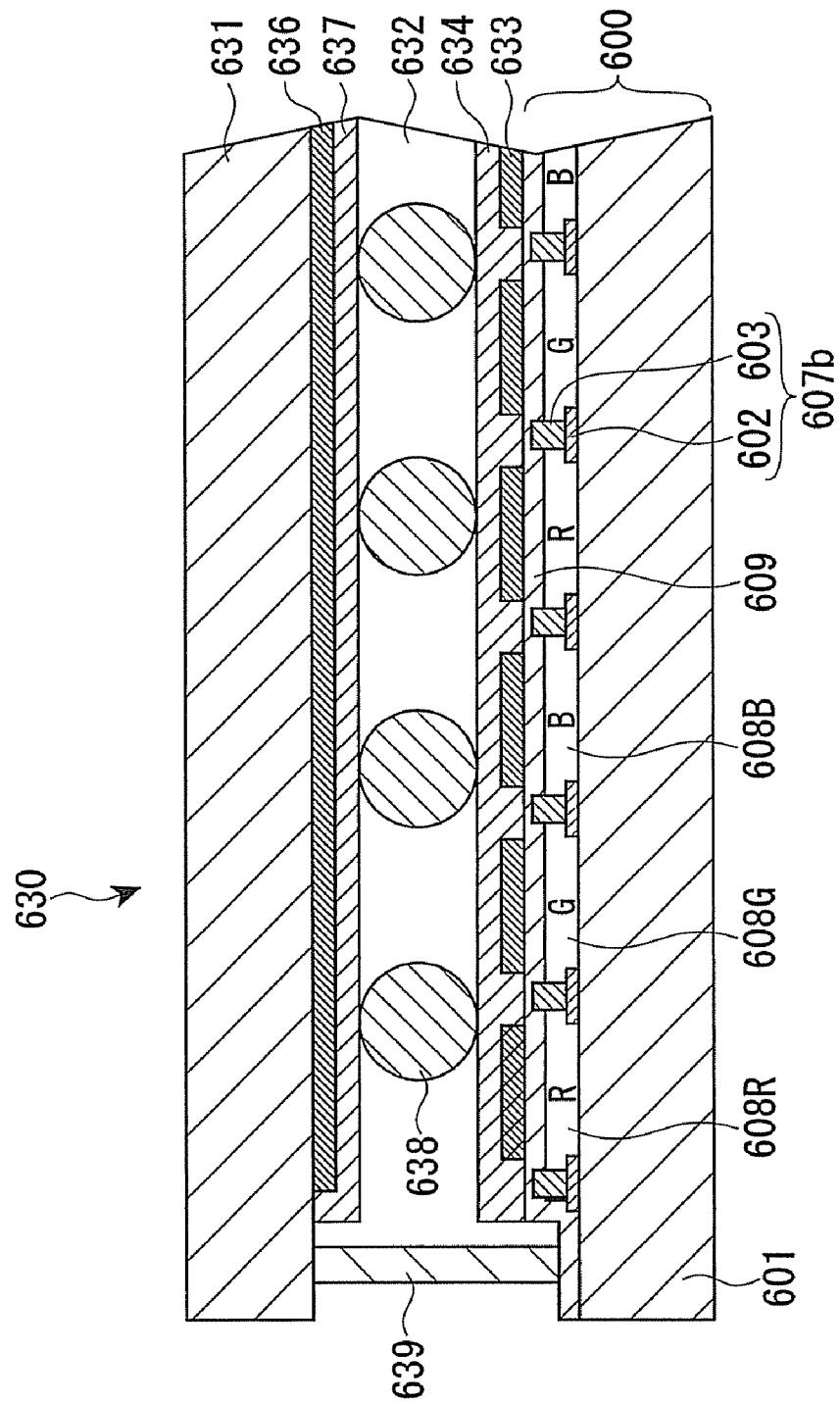
FIG. 9 is a cross-sectional view of a principal portion showing a schematic structure of a liquid crystal device using the color filter to which the invention is applied according to a second example.

FIG. 9 is a cross-sectional view of a principal portion showing a schematic structure of a second example of the liquid crystal device employing the color filter 600 manufactured in this embodiment.

A point significantly different from the above-described liquid crystal device 620 is the fact that the color filter 600 is arranged on the lower side in the drawing (opposite side from the viewer).

The liquid crystal device 630 generally includes a liquid crystal layer 632 formed of STN liquid crystal interposed between the color filter 600 and the opposing substrate 631 formed of a glass substrate or the like. Although not shown in the drawing, the deflecting plates or the like are arranged respectively on the outer surfaces of the opposing substrate 631 and the color filter 600.

Formed on the protective film 609 (on the liquid crystal layer 632 side) of the color filter are a plurality of first electrodes 633 of a rectangular shape elongated in the depth direction of the drawing at predetermined intervals, and a first orientation layer 634 is formed so as to cover the surfaces of the first electrodes 633 on the liquid crystal layer 632 side.

Formed on the surface of the opposing substrate 631 opposing to the color filter 600 are a plurality of second electrodes 636 of a rectangular shape extending in the direction orthogonal to the first electrodes 633 on the color filter 600 side at predetermined intervals, and the second orientation layer 637 is formed so as to cover the surface of the second electrode 636 on the liquid crystal layer 632 side.

The liquid crystal layer 632 is provided with spacers 638 for keeping the thickness of the liquid crystal layer 632 uniform, and a sealing member 639 for preventing the liquid crystal composition in the liquid crystal layer 632 from leaking outside.

Then, as in the case of the above-described liquid crystal device 620, the portions where the first electrodes 633 and the second electrodes 636 are intersected with each other are pixels, and it is adapted in such a manner that the colored layers 608R, 608G, 608B of the color filter are located at the portions corresponding to the pixels.

Figure 10:
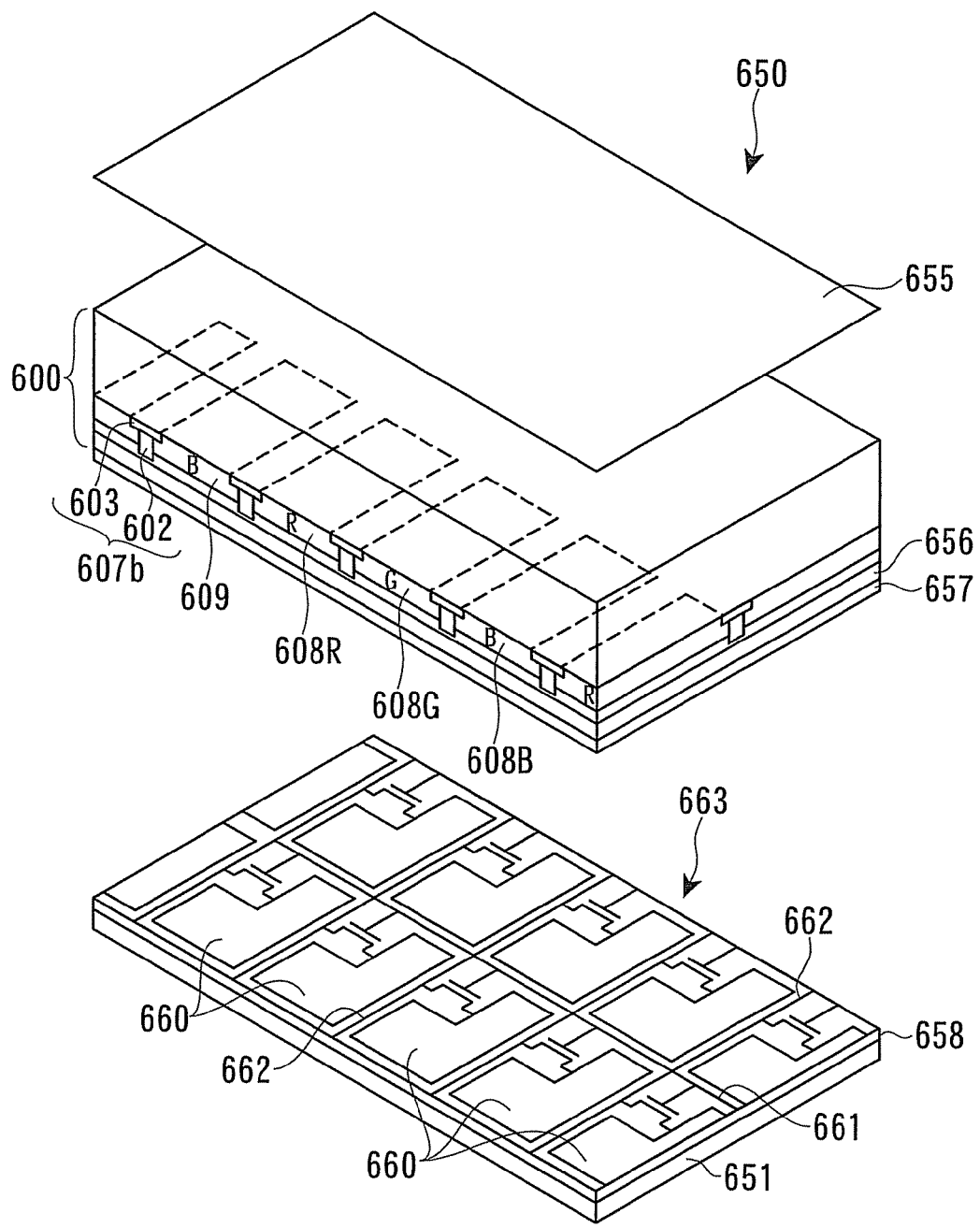
FIG. 10 is a cross-sectional view of a principal portion showing a schematic structure of a liquid crystal device using the color filter to which the invention is applied according to a third example.

FIG. 10 shows a third example in which the liquid crystal device is configure by employing the color filter 600 to which the invention is applied, and is an exploded perspective view showing a schematic structure of the transmissive TFT (Thin Film Transistor) liquid crystal device.

In the liquid crystal device 650, the color filter 600 is arranged on the upper side in the drawing (viewer side).

The liquid crystal device 650 generally includes the color filter 600, the opposing substrate 651 arranged so as to oppose thereto, a liquid crystal layer, not shown, interposed therebetween, a deflecting plate 655 arranged on the upper side (viewer side) of the color filter 600, and a deflecting plate (not shown) disposed on the lower side of the opposing substrate 651.

Formed on the surface of the protective film 609 of the color filter 600 (surface on the opposing substrate 651 side) is an electrode for driving the liquid crystal. The electrode 656 is formed of transparent conductive material such as ITO, and is a surface electrode which covers the entire area on which the pixel electrodes 660, described later, are formed. An orientation layer 657 is provided in a state of covering the surface of the electrode 656 opposite from the pixel electrodes 660.

Formed on the surface of the opposing substrate 651 opposing the color filter 600 is an insulating layer 658, and scanning lines 661 and signal lines 662 are formed on the insulating layer in a state of orthogonal to each other. Pixel electrodes 660 are formed in the areas surrounded by the scanning lines 661 and the signal lines 662. Although the orientation layer is provided on the pixel electrodes in the actual liquid crystal device, it is not shown in the drawing.

Thin film transistors 663 having source electrodes, drain electrodes, semiconductors, and gate electrodes are integrated in portions surrounded by a notched portion of the pixel electrode 660, the scanning line 661 and the signal line 662. The thin film transistor 663 is adapted to be turned on and off by application of signals to the scanning lines 661 and the signal lines, thereby controlling power supply of the pixel electrodes 660.

Although the liquid crystal devices 620, 630, and 650 in the above described respective examples are of transmissive type, it is also possible to configure into a reflective liquid crystal device or a transflective liquid crystal device by providing a reflective layer or a transflective layer.

Figure 11:
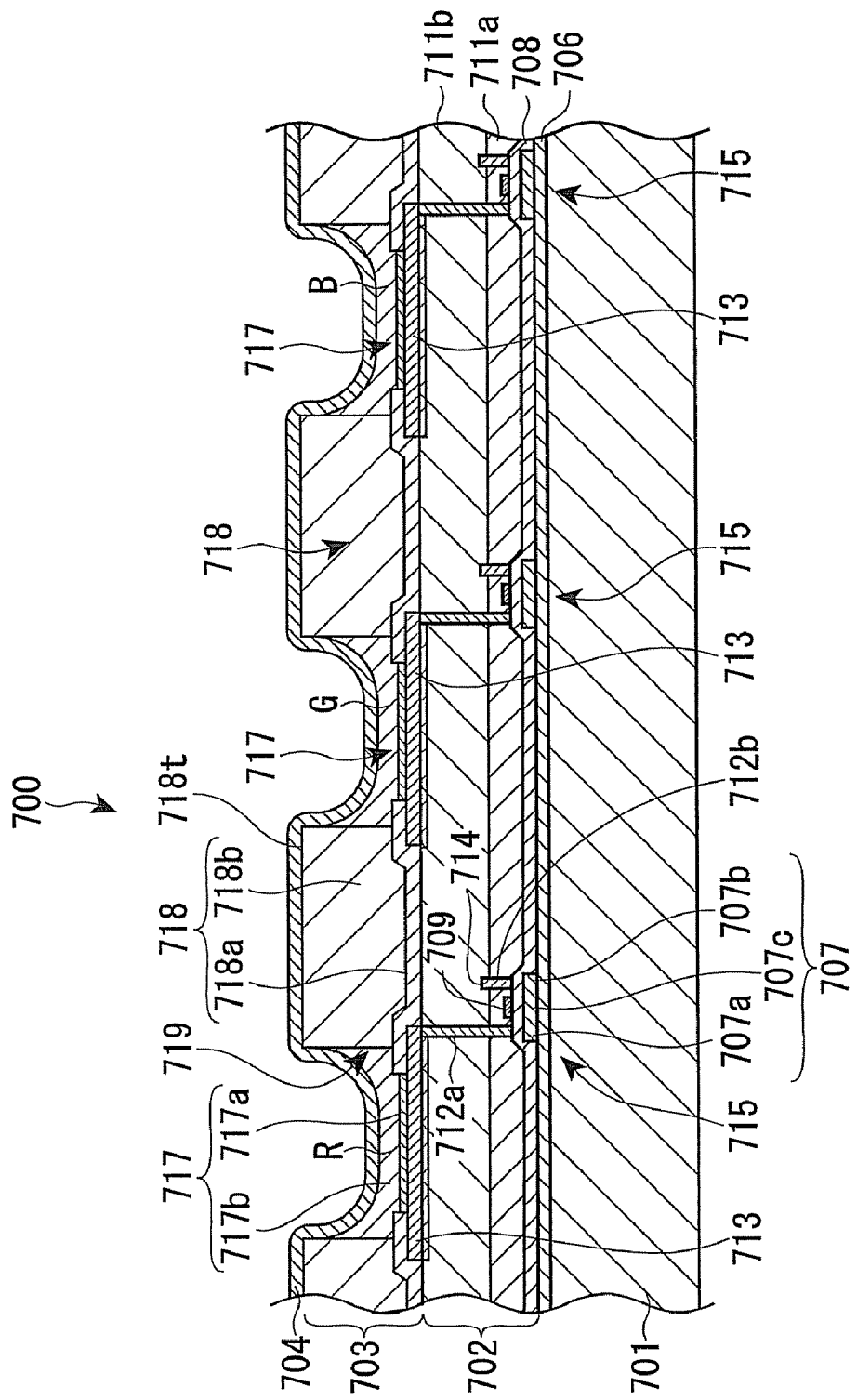
FIG. 11 is a cross-sectional view of a display device as an organic EL device.

FIG. 11 is a cross-sectional view showing a principal portion of the display area of the organic EL device (hereinafter, simply referred to as a display device 700).

The display device 700 generally includes a circuit element portion 702, a light-emitting element portion 703, and a cathode 704 layered on the substrate (W) 701.

In this display device 700, light emitted from the light-emitting element portion 703 toward the substrate 701 is transmitted through the circuit element portion 702 and the substrate 701 and emitted toward the viewer, and light emitted from the light-emitting element portion 703 toward the opposite side of the substrate 701 is reflected by the cathode 704, transmitted through the substrate 701, and emitted toward the viewer.

A base protective film 706 formed of a silicon oxide film is formed between the circuit element portion 702 and the substrate 701, and island shaped semiconductor films 707 formed of polycrystalline silicone are formed on the base protective film 706 (on the light-emitting portion 703 side). A source area 707a and a drain area 707b are formed on the left and right area of the semiconductor film 707 respectively by high-concentration cationic ion plantation. The center portion on which the cationic ion is not planted corresponds to a channel area 707c.

The circuit element portion 702 is formed with a transparent gate insulating film 708 for covering the base protective film 706 and the semiconductor film 707, and gate electrodes 709 formed for example of Al, Mo, Ta, Ti, W or the like are formed at positions corresponding to the channel areas 707c of the semiconductor film 707 on the gate insulating film 707. A first inter-layer insulating film 711a and a second inter-layer insulating film 711b, which are transparent, are formed on the gate electrodes 706 and the gate insulating layer 708. Contact holes 712a 712b which penetrates the first and second inter-layer insulating films 711a, 711b to be in communication with the source areas 707a and the drain areas 707b respectively are formed.

Transparent electrodes 713 formed of ITO are formed by patterned into a predetermined shape on the second inter-layer insulating film 711b, and the pixel electrodes 713 are connected to the source areas 707a through the contact holes 712a.

Power source lines 714 are disposed on the first inter-layer insulating film 711a, and the power source lines 714 are connected to the drain areas 707b through the contact holes 712b.

In this manner, the circuit element portion 702 is formed with the thin-film transistors 715 for driving connected to the respective pixel electrodes 713, respectively.

The light-emitting element portion 703 generally includes functional layers 717 which are layered on the plurality of pixel electrodes 713 respectively, and bank portions 718 provided between the respective pixel electrodes 713 and the functional layers 717 for partitioning the respective functional layers 717.

The light-emitting element is composed of the pixel electrodes 713, the functional layers 717 and the cathodes 704 disposed on the functional layers 717. The pixel electrodes 713 are formed substantially into a rectangular shape in plan view by patterning, and the bank portions 718 are formed between the respective pixel electrodes 713.

The bank portion 718 includes an inorganic bank layer 718a formed of inorganic material such as SiO, $SiO_2$, $TiO_2$ (first bank layer), an organic bank layer 718b of trapezoidal shape in cross section layered on the inorganic bank layer 718a and formed of resist which is superior in heat resistant property and solvent resistant property such as acrylic resin or polyimide resin or the like (second bank layer). The bank portion 718 is partly formed to climb on the peripheral edge of the pixel electrode 713.

Formed between the respective bank portions 718 are openings 719 opening so as to increase in width gradually upward with respect to the pixel electrodes.

The functional layers 717 include hole-injecting/hole-transporting layers 717a formed on the pixel electrodes 713 in the openings 719 in a layered state, and light-emitting layers 717b formed on the hole-injecting/hole-transporting layers 717a. It is also possible to further form an additional functional layers adjacent to the light-emitting layers 717b having another function. For example, it is also possible to form an electron transporting layers.

The hole-injecting/hole-transporting layers 717a have a function to transport the positive hole from the pixel electrode 713 side and fill the same into the light-emitting layers 717b. The hole-injecting/hole-transporting layers 717a are formed by discharging a first composition (functional liquid) including the positive hole filling/transporting layer forming material. The positive hole filling/transporting layer forming material used here is a publicly known material.

The light-emitting layers 717b are layers emitting light in any one of red (R), green (G), or blue (B), and are formed by discharging the second composition (functional liquid) including the light emitting layer forming material (light emitting material). As a solvent of the second composition (nonpolar solvent), a publicly known material which is insoluble with respect to the hole-injecting/hole-transporting layers 717a are preferably used, and by using such an insoluble solvent for the second composition of the light-emitting layers 717b, the light-emitting layers 717b can be formed without allowing the hole-injecting/hole-transporting layers 717 to be dissolved again.

Then, the light-emitting layers 717b are adapted to emit light by the positive hole filled from the hole-injecting/hole-transporting layers 717a and the electrons filled from the cathode 704 combined again in the light-emitting layers.

The cathode 704 is formed in a state of covering the entire surface of the light emitting element portion 703, and serves to flow a current to the function layers 717 with the pixel electrodes 713 in pair. A sealing member, not shown, is arranged on top of the cathode 704.

Subsequently, referring to FIG. 12 to FIG. 20, the manufacturing process of the above-described display device 700 will be described.

As shown in FIG. 12, this display device 700 is manufactured through a bank portion forming step (S111), the surface processing step (S112), a hole-injecting/hole-transporting layer forming step (S113), a light-emitting layer forming step (S114), and an opposite electrode forming step (S115). The manufacturing process is not limited to the one shown as an example, and some of the steps may be omitted or some other steps may be added as needed.

Figure 13:
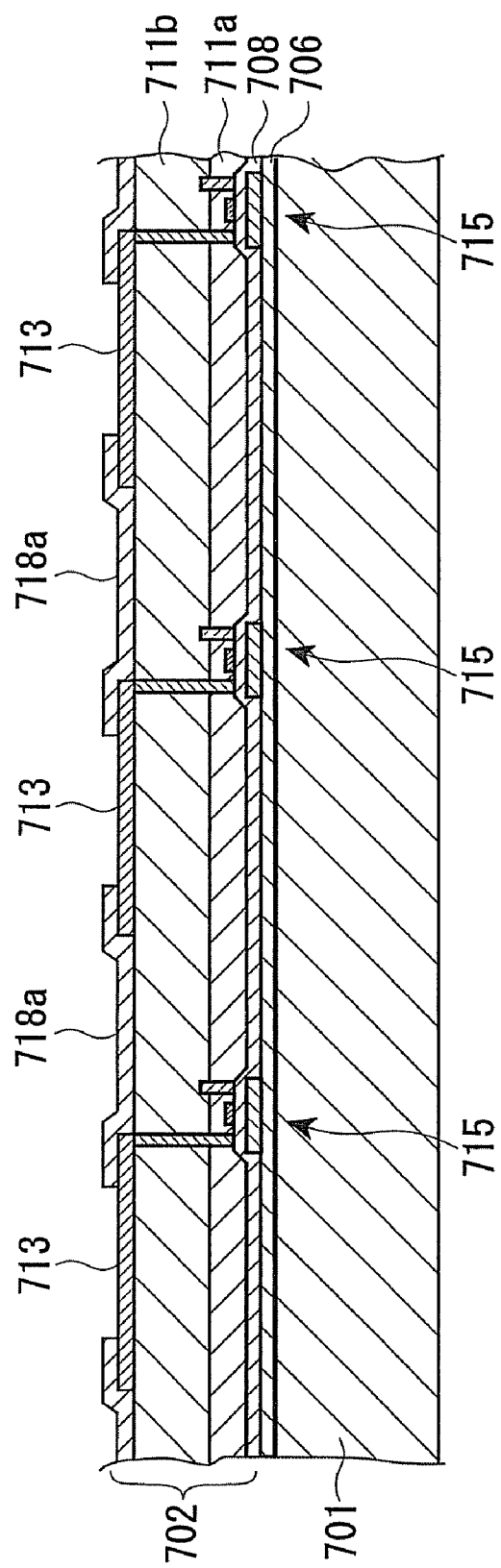
FIG. 13 is a process drawing explaining formation of an inorganic bank layer.

In the bank portion forming step (S111), as shown in FIG. 13, an inorganic bank layers 718a are formed on the second inter-layer insulating film 711b. The inorganic bank layers 718a are formed by forming the inorganic films at an involved positions and then patterning the inorganic films with a photolithography technique. At this time, the inorganic bank layers 718a are formed so as to be partly overlapped with the peripheral portions of the pixel electrodes 713.

Figure 14:
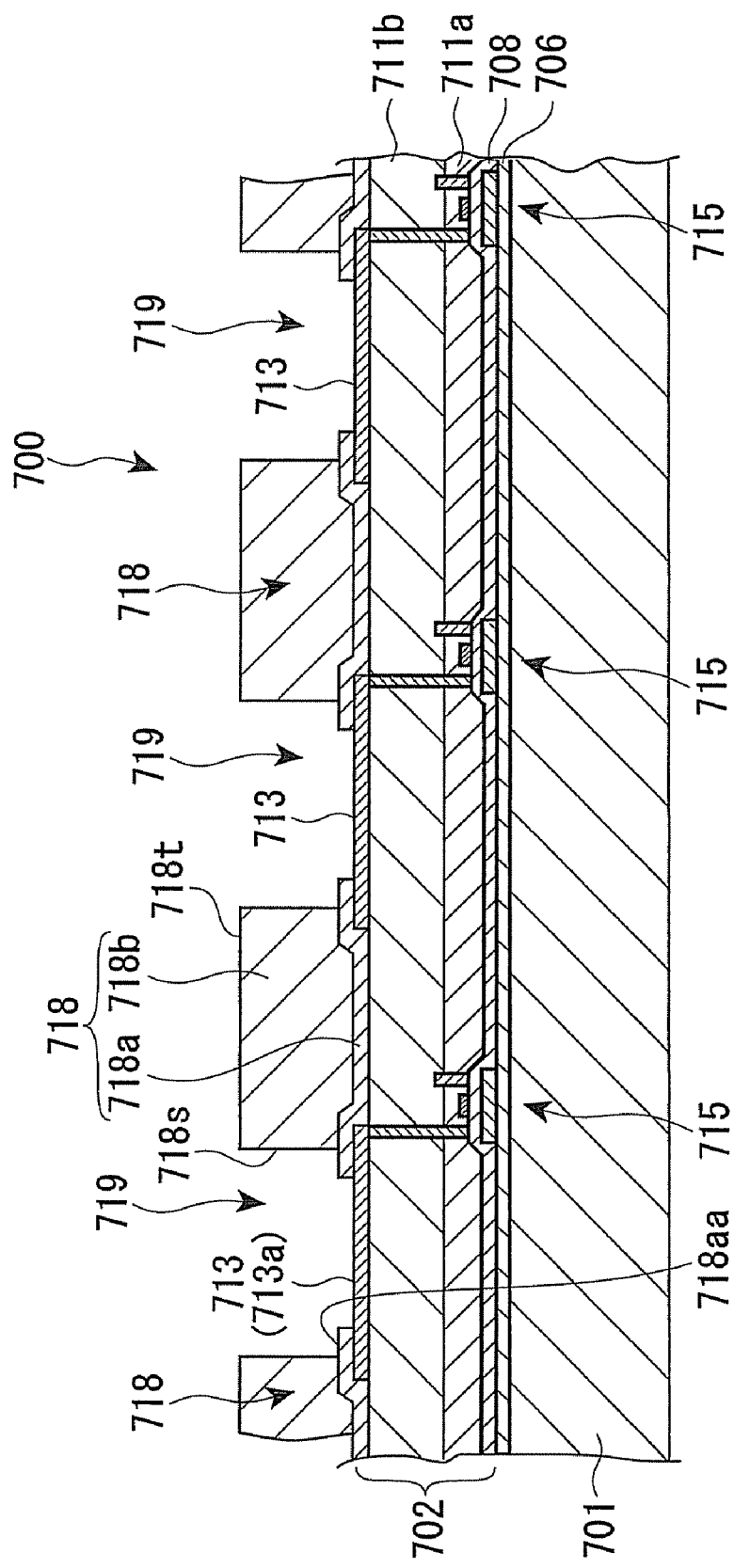
FIG. 14 is a process drawing explaining formation of an organic bank layer.

After having formed the inorganic bank layers 718a, as shown in FIG. 14, the organic bank layers 718b are formed on the inorganic bank layers 718a. The organic bank layers 718b are also formed by patterning with the photolithography technique as in the case of the inorganic bank layers 718*a*.

The bank portions 718 are formed in this manner. In association with this procedure, the openings 719 opening upward with respect to the pixel electrodes 713 are formed between the respective balk portions 718. The openings 719 define the pixel areas.

In the surface processing step (S112), processing to provide lyophilic property and liquid repellent property is carried out. Areas to be subjected to the processing to provide the lyophilic property are first layer portion 718*aa* and the electrode surfaces 713 of the pixel electrodes 713, and the surfaces of these areas are processed by plasma processing, for example, with oxygen as processing gas to have lyophilic property. The plasma processing also serves to clean the ITO as the pixel electrodes 713.

The processing to provide liquid repellent property is carried out on the wall surfaces 718*s* of the organic bank layers 718*b* and the upper surfaces 718*t* of the organic bank layer 718*b*, and the surfaces are fluoridated (processed to have liquid repellent property) by plasma processing with 4 methane fluoride as processing gas.

With this surface processing, the functional liquid droplets can be received certainly in the pixel areas when the functional layers 717 are formed using the functional liquid droplet ejection heads 42, and the functional liquid droplets received in the pixel areas can be prevented from spilling over the openings 719.

Then, by going through the steps described above, the display device base body 700A is placed on a set table 21 of the liquid droplet ejection apparatus 1 shown in FIG. 1, and a hole-injecting/hole-transporting layer forming step (S113) and a light-emitting layer forming step (S114) shown below are carried out.

Figure 15:
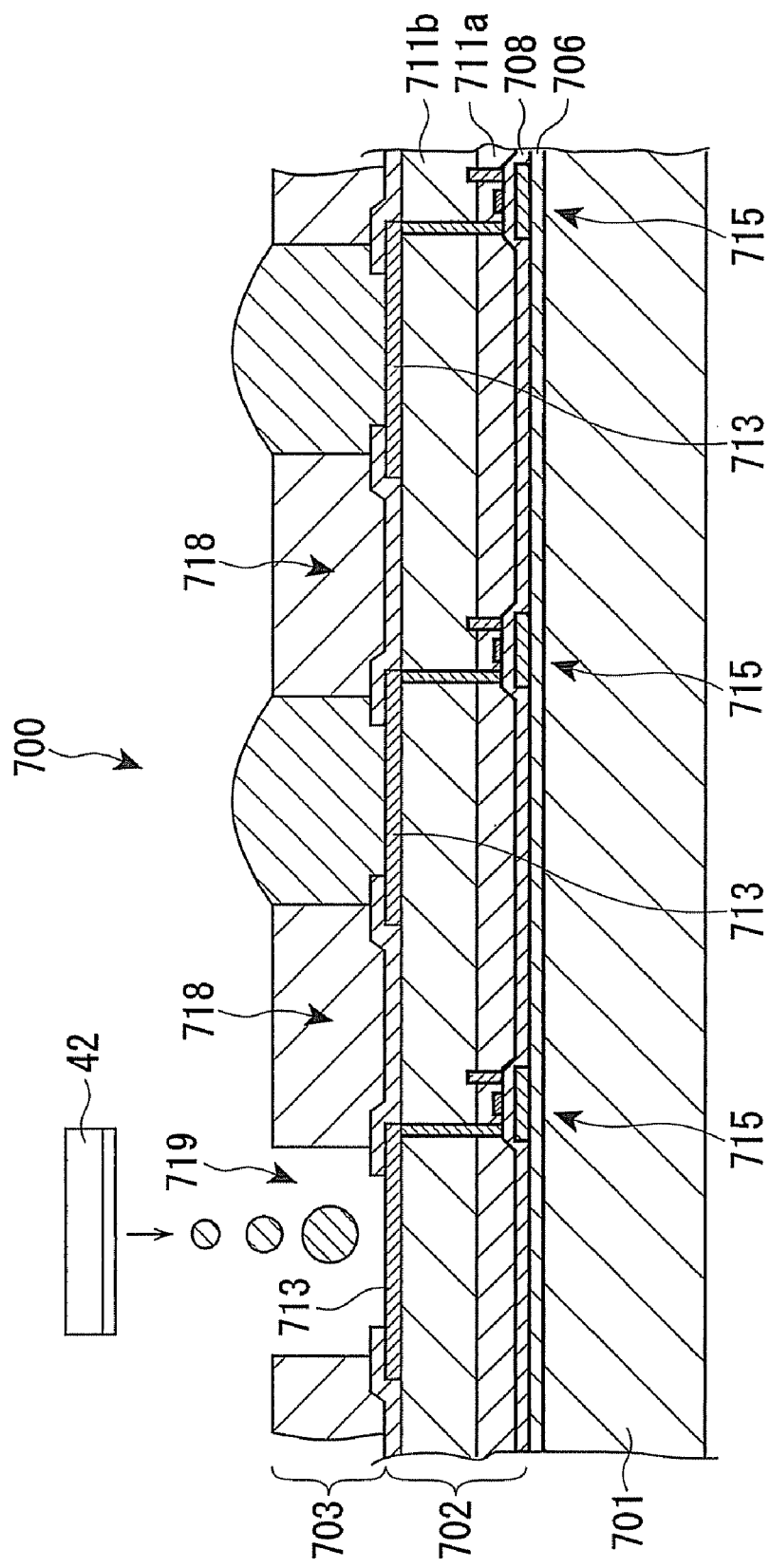
FIG. 15 is a process drawing explaining a process of forming hole-injecting/hole-transporting layers.
Figure 16:
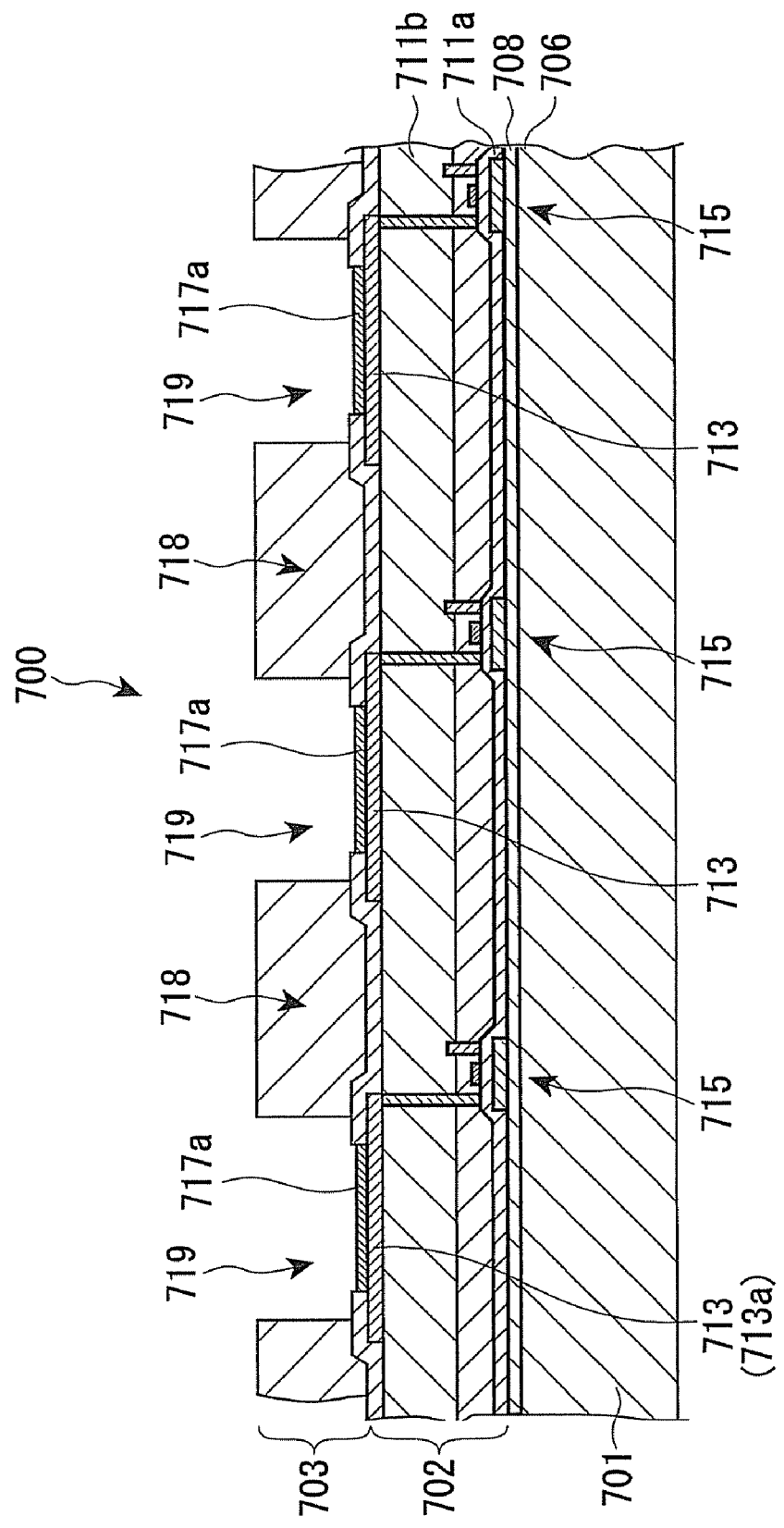
FIG. 16 is a process drawing explaining a state in which the hole-injecting/hole-transporting layers.

As shown in FIG. 15, in the hole-injecting/hole-transporting layer forming step (S113), the first composition including the positive hole filling/transporting layer forming material is ejected into the respective openings 719 from the functional liquid droplet ejection heads 42. Subsequently, as shown in FIG. 16, the drying process and heat-treatment are carried out for drying off the polar solvent contained in the first composition, whereby the hole-injecting/hole-transporting layers 717*a* are formed on the pixel electrodes (electrode surfaces 713*a*) 713.

The light-emitting layer forming step (S114) will now be described. In this light-emitting layer forming step, as described above, non-polar solvent which is insoluble with respect to the hole-injecting/hole-transporting layers 717*a* is used as the solvent of the second composition used for forming the light-emitting layers in order to prevent the hole-injecting/hole-transporting layers 717*a* from being dissolved again.

However, on the other hand, since the hole-injecting/hole-transporting layers 717*a* are low in affinity with respect to the non-polar solvent, even when the second composition containing the non-polar solvent is ejected on the hole-injecting/hole-transporting layers 717*a*, the hole-injecting/hole-transporting layers 717*a* and the light-emitting layers 717*b* may not be brought into tight contact with each other, or the light-emitting layers 717*b* may not be applied uniformly.

Therefore, in order to improve affinity of the surfaces of the hole-injecting/hole-transporting layers 717*a* with respect to the non-polar solvent and the light-emitting layer forming material, the surface treatment (surface reforming treatment) is preferably carried out before forming the light-emitting layer. The surface treatment is carried out by applying a surface reforming material which is the same solvent as the non-polar solvent of the second composition used when forming the light-emitting layer or the solvent similar thereto on the hole-injecting/hole-transporting layers 717*a*, and letting them to dry.

After this treatment, the surfaces of the hole-injecting/hole-transporting layers 717*a* have a predilection for the non-polar solvent, whereby the second composition containing the light-emitting layer forming material can be applied uniformly on the positive hole-injecting/hole-transporting layers 717*a* in a subsequent step.

Figure 17:
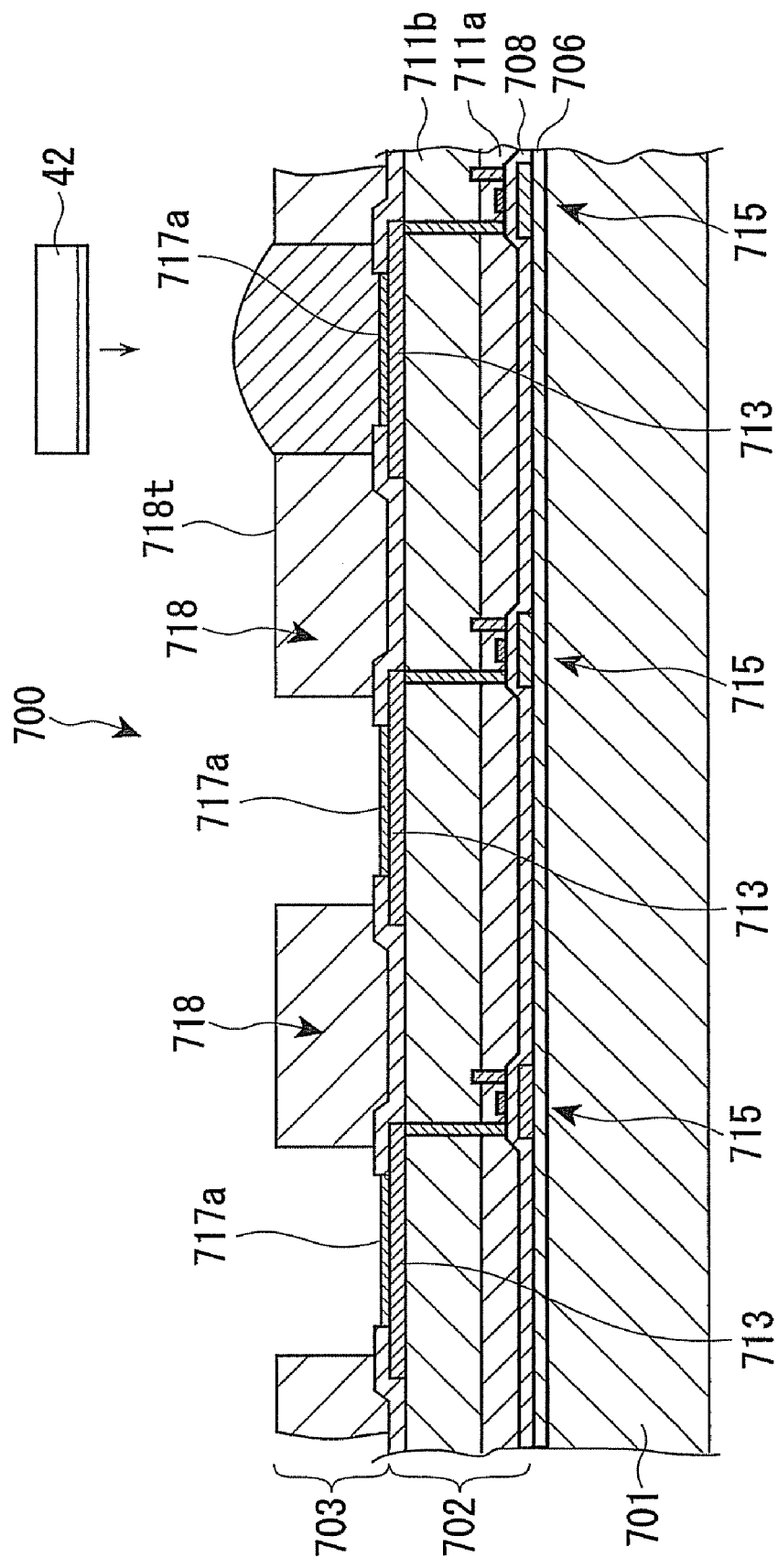
FIG. 17 is a process drawing explaining a process of forming a light-emitting layer of blue color.
Figure 18:
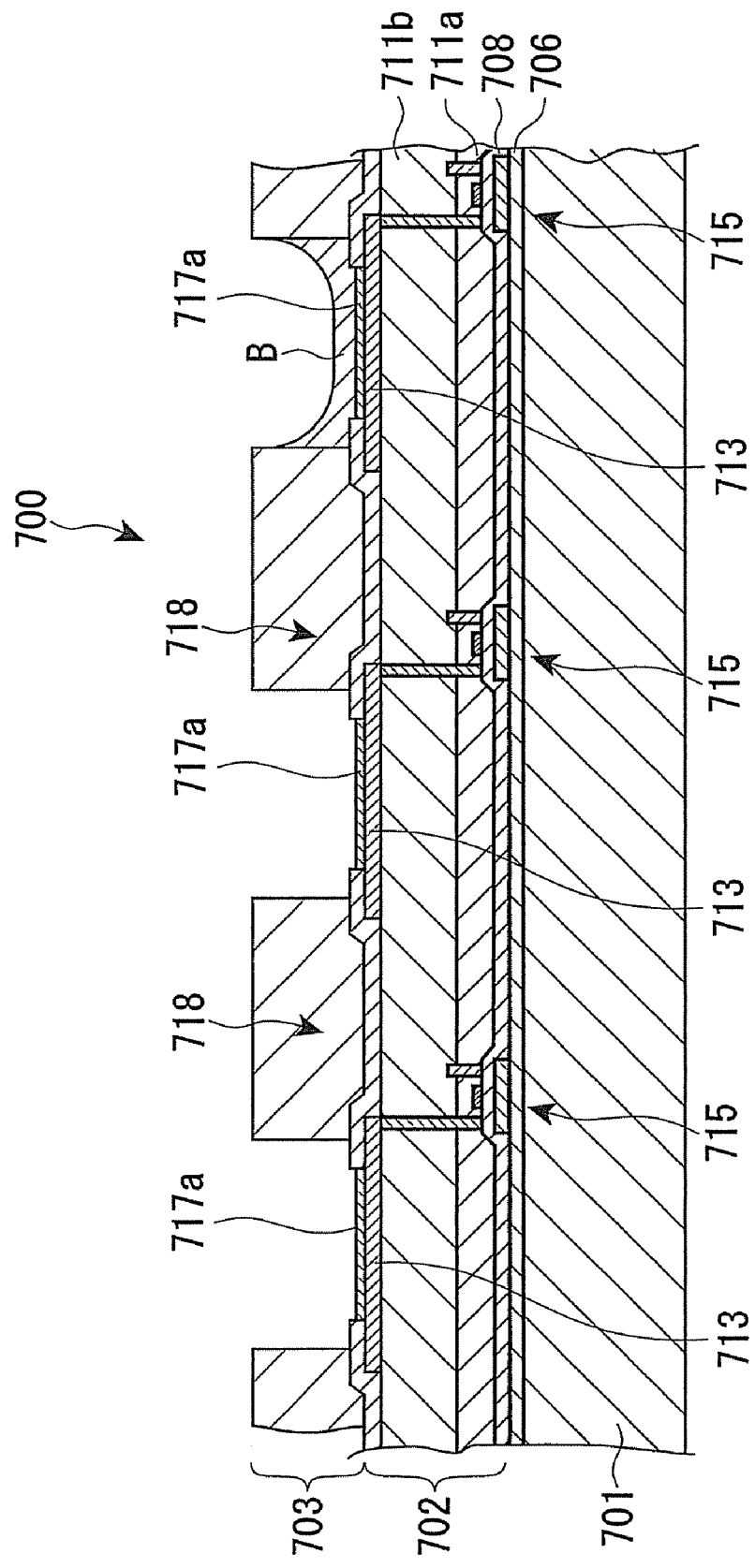
FIG. 18 is a process drawing explaining a state in which the light-emitting layer of blue color is formed.

Then, as shown in FIG. 17, the second composition containing the light-emitting layer forming material corresponding to any one of the colors (blue (B) in the example in FIG. 17) is shot into the pixel areas (opening portions 719) as the functional liquid droplets by a predetermined amount. The second composition shot into the pixel areas are spread on the hole-injecting/hole-transporting layers 717*a* and filled in the openings 719. When the second composition is deviated from the pixel areas and received by the upper surfaces 718*t* of the bank portions 718, since the upper surfaces 718*t* are provided with liquid repellent property as described above, the second composition can easily tumble into the openings 719.

Subsequently, by carrying out the drying step, the second composition after ejection is dried, and hence the non-polar solvent contained in the second composition is also dried off, whereby the light-emitting layers 717*b* are formed on the hole-injecting/hole-transporting layers 717*a*. In the case shown in FIG. 18, the light-emitting layers 717*b* corresponding to blue (B) color are formed.

Figure 19:
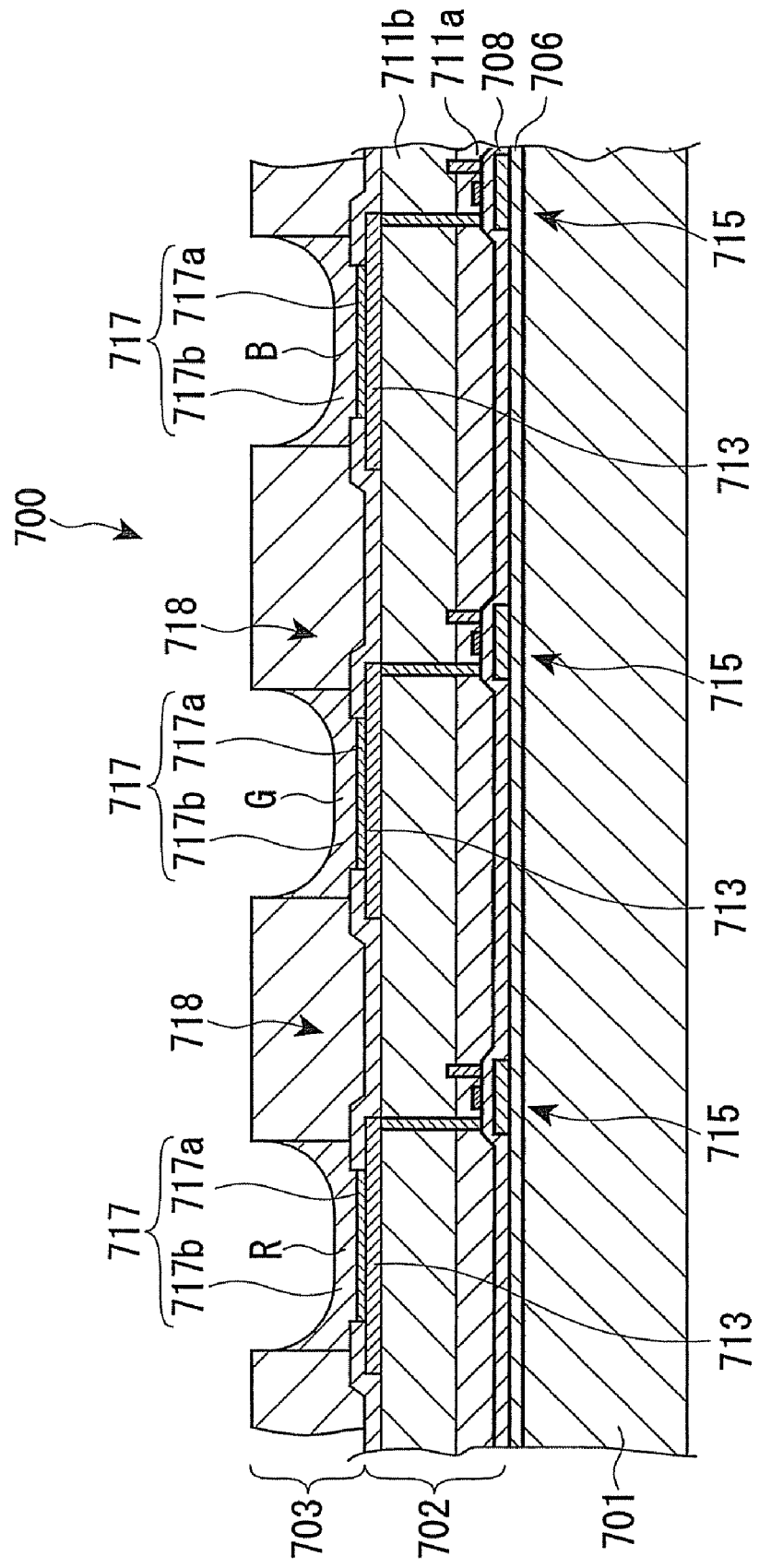
FIG. 19 is a process drawing explaining a state in which the light-emitting layers of the respective colors are formed.

In the same manner, as shown in FIG. 19, the same steps as in the case of the light-emitting layers 717*b* corresponding to the blue (B) color described above are carried out in sequence, whereby the light emitting layers 717*b* corresponding to other colors (red (R) and green (G)) are formed. The order of formation of the light-emitting layers 717 are not limited to that shown in the example, and may be formed in any order. For example, it is also possible to determine the order of formation according to the light-emitting layer forming material. The array patterns of the three colors R, G, B include the stripe array, the mosaic array, and the delta array.

As described above, the functional layers 717, that is, the hole-injecting/hole-transporting layers 717*a* and the light-emitting layers 717*b* are formed on the pixel electrodes 713. Then, the procedure goes to the opposite electrode forming step (S115).

Figure 20:
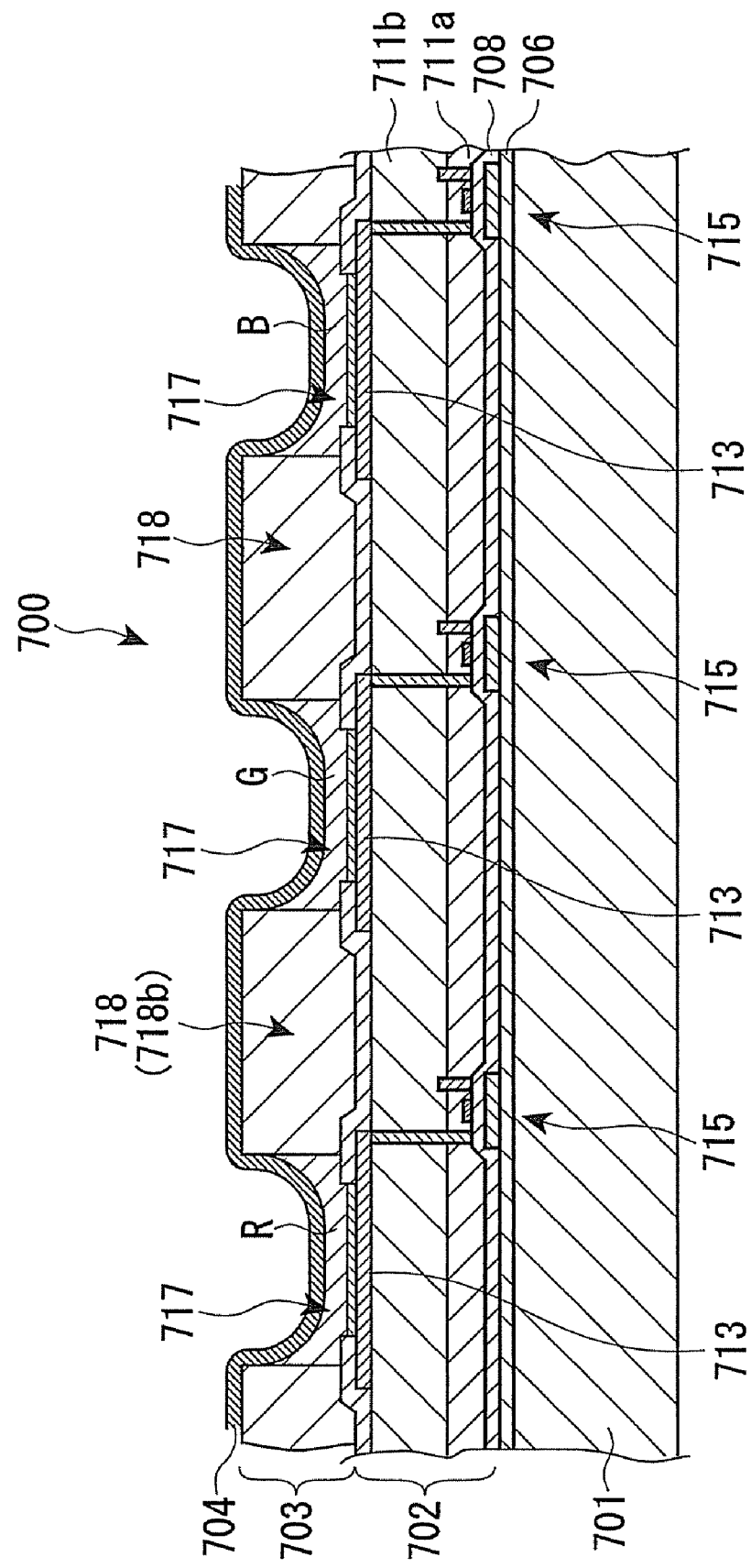
FIG. 20 is a process drawing explaining formation of a cathode.

In the opposite electrode forming step (S115), as shown in FIG. 20, a cathode 704 (opposite electrode) is formed on the entire surface of the light emitting layers 717*b* and the bank layer 718*b* by, for example, the evaporating method, the sputtering process, and the CVD method. The cathode 704 in this embodiment is configured of, for example, lamination layer including the calcium layer and the aluminum layer.

Provided on top of the cathode 704 are Al film, Ag film as electrodes and a protective layer such as $SiO_2$ or SiN for preventing oxidation thereof as needed.

After having formed the cathode 704 in this manner, other processes such as the sealing process for sealing the top of the cathode 704 by the sealing member or the wiring process are carried out to obtain the display device 700.

Figure 21:
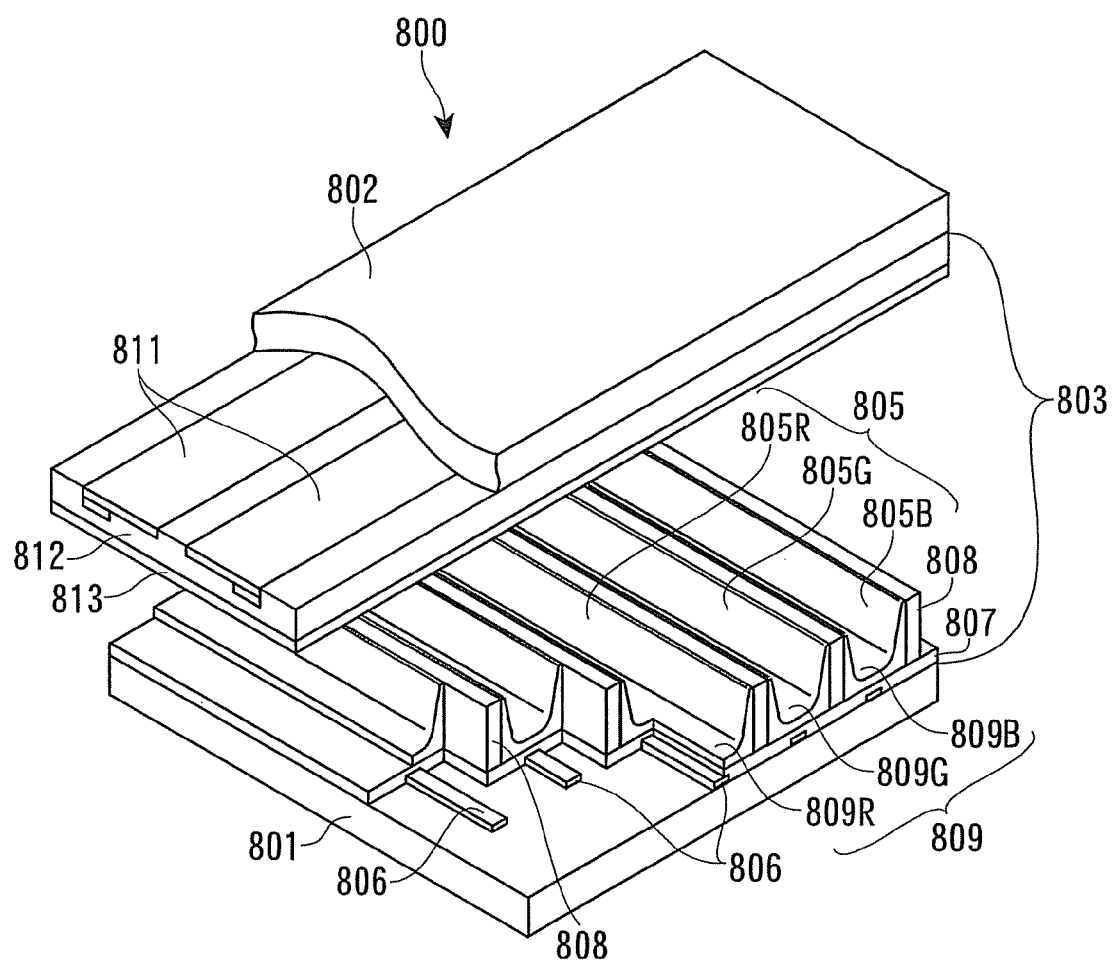
FIG. 21 is an exploded perspective view of a principal portion of a display device as a plasma display device (PDP device)

Subsequently, FIG. 21 is an exploded perspective view showing a principal portion of the plasma display device (PDP device: hereinafter, referred to simply as a display device 800). In this drawing, the display device 800 is shown in a state of being partly broken.

The display device 800 generally includes a first substrate 801 and a second substrate 802 arranged so as to face each other, and a electric-discharge display unit 803 formed therebetween. The electric-discharge display unit 803 includes a plurality of electric-discharge chambers 805. Three electric-discharge chambers 805 including a red electric-discharge chamber 805R, a green electric-discharge chamber 805G, and a blue electric-discharge chamber 805B out of these plurality of electric-discharge chambers 805 constitute a group which corresponds to one pixel.

Address electrodes 806 are formed on the upper surface of the first substrate 801 in stripe at predetermined intervals, and a dielectric layer 807 is formed so as to cover the address electrodes 806 and the upper surface of the first substrate 801. Partitioning walls 808 are provided upright between the respective address electrodes 806 on the dielectric layer 807 so as to extend along the respective electrodes 806. The partitioning wall 808 includes those extending on both sides in the width direction of the address electrodes 806 and those which extend in the direction orthogonal to the address electrode 806.

The areas partitioned by the partitioning walls 808 are the electric-discharge chambers 805.

Phosphors 809 is arranged in the electric-discharge chambers. The phosphors 809 emits fluorescent light in any one of red (R), green (G), and blue (B). Red phosphors 809R is arranged on the bottom of the red electric-discharge chamber 805R, green phosphors 809G is arranged on the bottom of the green electric-discharge chamber 805G, and blue phosphors 809B is arranged on the bottom of the blue electric-discharge chamber 805B, respectively.

A plurality of display electrodes 811 are arranged in stripe at predetermined intervals in the direction orthogonal to the address electrodes 806. Then, a dielectric layer 812 and a protective film formed of MgO or the like are formed so as to cover these electrodes.

The first substrate 801 and the second substrate 802 are adhered so as to oppose to each other in a state in which the address electrodes 806 and the display electrodes 811 are oriented orthogonally with respect to each other. The address electrodes 806 and the display electrodes 811 are connected to an AC power source, not shown.

Then, by supplying power to the respective electrodes 806, 811, the phosphors 809 is excited and emits light in the electric-discharge display unit 803, whereby color display is enabled.

In this embodiment, the liquid droplet ejection apparatus 1 can be used for forming the address electrodes 806, the display electrodes 811, and the phosphors 809. A step of forming the address electrodes 806 on the first substrate 801 will be shown.

In this case, the following steps are carried out in a state in which the first substrate 801 is placed on the set table 21 of the liquid droplet ejection apparatus 1.

Liquid material (functional liquid) containing material for forming conductive film wiring is received as functional liquid droplets in the address electrode forming areas by the functional liquid droplet ejection head 42. The liquid material is carrier medium including conductive particles such as metal dispersed therein as material for forming conductive film wiring. The conductive particles used here may be metal particles containing gold, silver, copper, palladium, or nickel, or conductive polymer or the like.

After having terminated replenishment of liquid material for all the address electrode forming areas to be replenished, the liquid material after ejection is dried, and hence the carrier medium contained in the liquid material is dried off, whereby the address electrodes 806 are formed.

Although the formation of the address electrodes 806 is exemplified above, the display electrodes 81 and the phosphors 809 can also be formed by carrying out the above-described respective steps.

In the case of the display electrode 811, the liquid material (functional liquid) containing the material for conductive film wiring is received as the functional liquid droplets in the display electrode forming areas as in the case of the address electrodes 806.

In the case of the phosphors 809, the liquid material (functional liquid) containing phosphors corresponding to the respective colors (R, G, B) are ejected as liquid droplets from the functional liquid droplet ejection heads 42 and received in the electric-discharge chamber in corresponding color.

Figure 22:
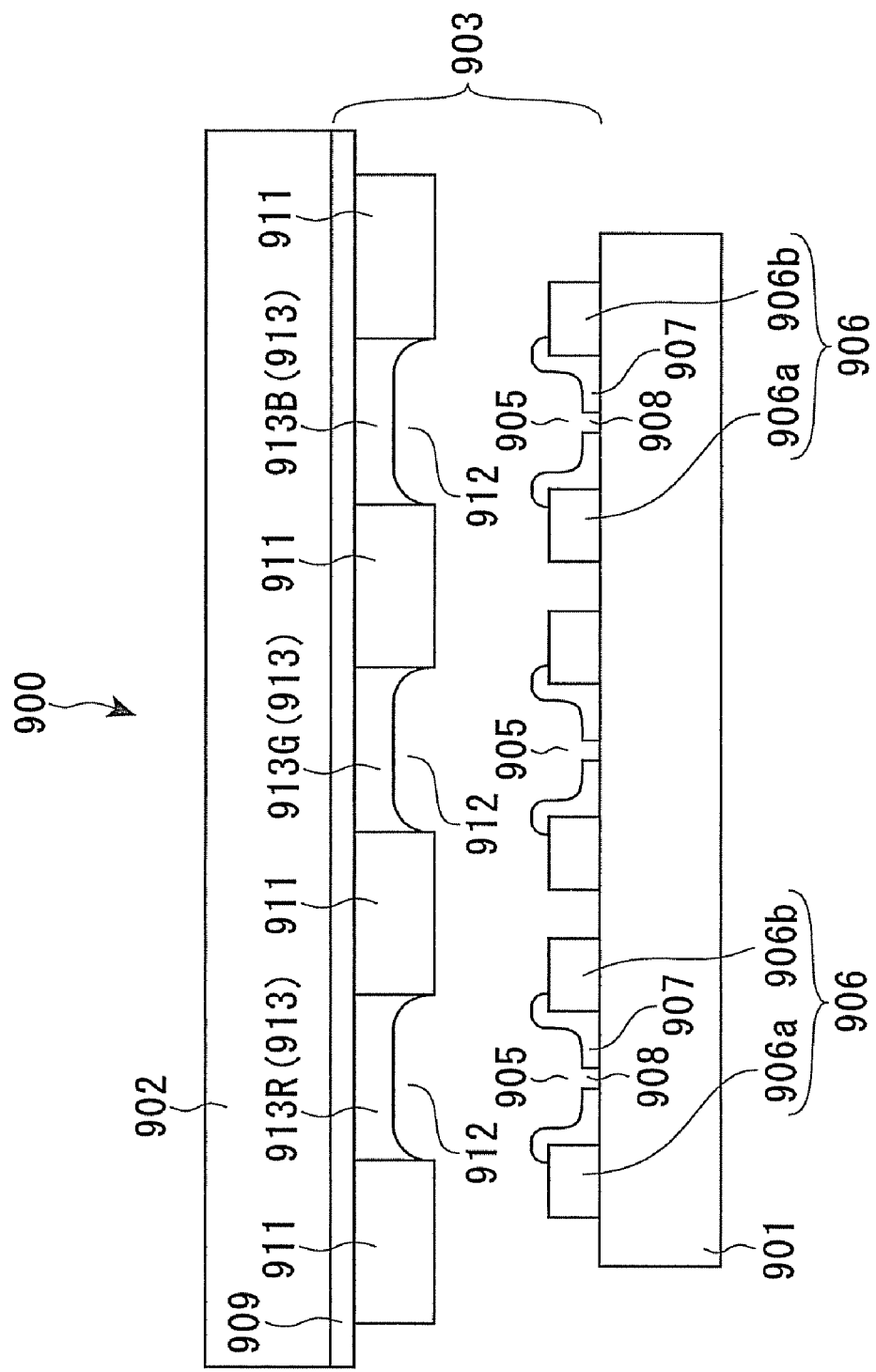
FIG. 22 is a cross-sectional view of a principal portion of the display device as an electron discharge device (FED device)

FIG. 22 is a cross-sectional view showing a principal portion of the electron discharge device (also referred to as FED device or SED device: hereinafter, referred to simply as a display device 900). In the same drawing, the display device 900 is shown partly in cross-section.

The display device 900 includes a first substrate 901 and a second substrate 902 arranged so as to oppose to each other, and a field emission display unit 903 formed therebetween. The field emission display unit 903 includes a plurality of electron discharge sections 905 arranged in a matrix manner.

First element electrodes 906a and second element electrodes 906b are formed orthogonally to each other on the upper surface of the first substrate 901. Portions partitioned by the first element electrodes 906a and the second element electrodes 906b are formed with conductive films each formed with a gap 908. In other words, a plurality of the electron discharge sections 905 are composed of the first element electrode 906a, the second element electrode 906b and the conductive films 907. The conductive films 906 are formed of palladium oxide (PdO) or the like, and the gaps 908 are formed by shaping or the like after the conductive film 907 are formed.

An anode electrode, which opposes the cathode electrodes, is formed on the lower surface of the second substrate 902. A bank portion 911 in a reticular pattern is formed on the lower surface of the anode electrode 909, and phosphors 913 is arranged in the respective openings 912 facing downward and being surrounded by the bank portions 911 so as to correspond to the electron discharge sections. The phosphors emits fluorescent light of any one of the colors of red (R), green (G), and blue (B), and the red phosphors 913R, the green phosphors 913G, and the blue phosphors 913B are arranged in the respective openings 912 in the above-described predetermined pattern.

The first substrate 901 and the second substrate 902 are adhered to each other with a minute gap formed therebetween. In this display device 900, electrons jumped out from the first element electrodes 906a or the second element electrodes 906b as the cathodes through the conductive films (gaps 908) 907 are excited by being hit at the phosphors 913 formed on the anode electrode 909, whereby color display is enabled.

In this case as well, the first element electrodes 906a, the second element electrode 906b, the conductive films 907, and the anode electrode 909 can be formed by using the liquid droplet ejection apparatus 1 as in the case of other embodiments, and the phosphors 913R, 913G, 923B of respective colors may be formed using the liquid droplet ejection apparatus 1.

Figure 23A:
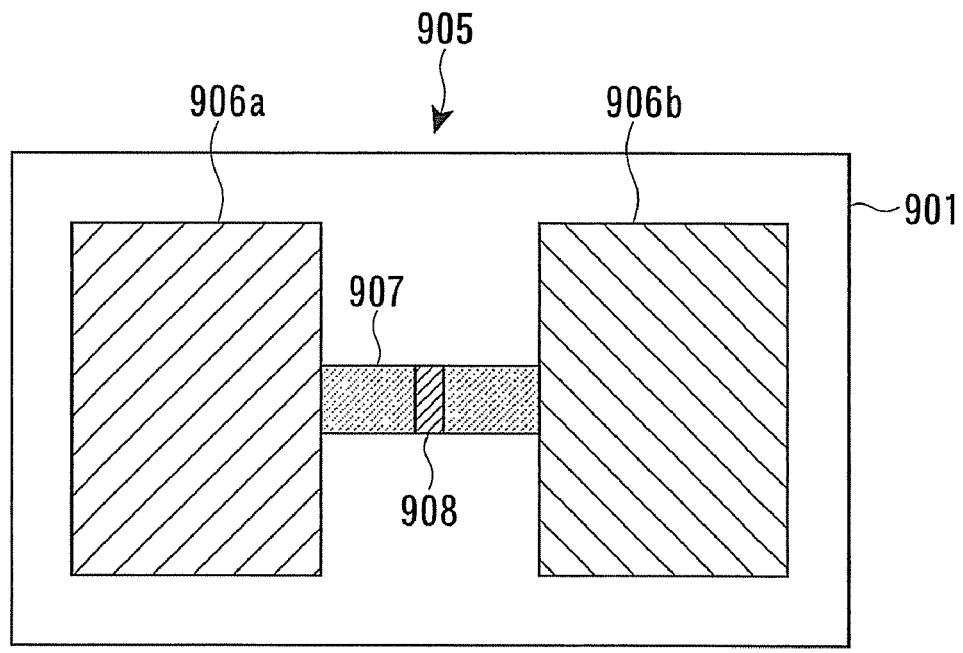
FIG. 23A is a plan view illustrating the portion around the electron discharging sections of the display device and FIG. 23B is a plan view showing a method of forming the same.
Figure 23B:
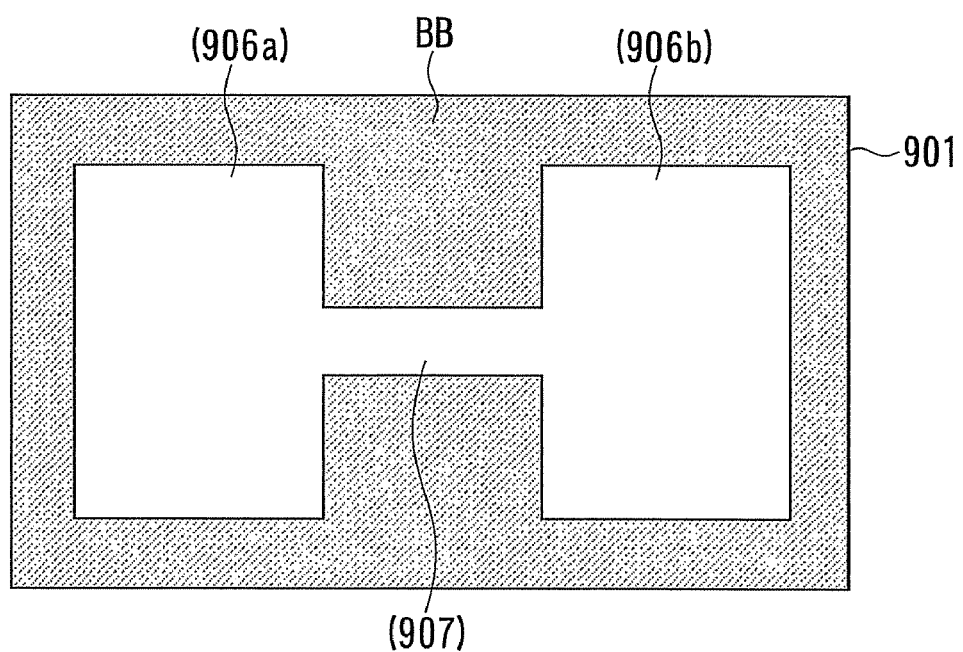

The first element electrode 906a, the second element electrode 906b and the conductive film 907 have a planar shape as shown in FIG. 23A. When forming these films, as shown in FIG. 23B, the bank portions BB is formed (photolithography method) while leaving spaces for forming the first element electrodes 906*a*, the second element electrodes 906*b*, and the conductive films 907 in advance. Then, the first element electrodes 906*a* and the second element electrodes 906*b* are formed (by the inkjet method with the liquid droplet ejection apparatus 1) at grooves formed by the bank portions BB, then the solvent is dried to form the film, and then the conductive films 907 are formed (by the inkjet method with the liquid droplet ejection apparatus 1). Subsequently, after having formed the conductive films 907, the bank portions BB are removed (ashing separation), and then the procedure goes to the above-described shaping process. As in the case of the above-described organic EL device, it is preferable to provide lyophilic property to the first substrate 901 and the second substrate 902 to provide liquid repellent property to the bank portions 911, BB.

Other electro-optic device which may be contemplated includes devices for forming metal wiring, forming lens, forming resist, forming light diffusing material, and the like. By employing the above-described liquid droplet ejection apparatus 1 for manufacture of the various electro-optic devices, various electro-optic devices can be manufacture efficiently.

What is claimed is:

1. An apparatus for ejecting liquid droplets for drawing a pattern on a work having a plurality of drawing areas provided in a longitudinal direction, the apparatus comprising:
    a suction table disposed in a drawing space for holding the work by suction;
    a delivering unit that intermittently delivers the work onto the suction table in a sagged state;
    a drawing unit that draws a pattern on the work held by suction by driving the functional liquid droplet ejection head to eject liquid droplets;
    a work receiving unit that receives the drawn-on work in a sagged state from the suction table; and
    a flushing unit in the drawing space on a feeding path of the work, the flushing unit including a flushing box which is provided between a lower surface of the functional liquid droplet ejection head and a sagged portion located at least at one of the sagged portions of the work for receiving ejected liquid droplets from the functional liquid droplet ejection head.

2. The apparatus according to claim 1, further comprising:
    alignment marks provided on the work for correcting positions of the respective drawing areas, and
    an image recognition means for photographing the alignment marks and recognizing the image and a θ-table for correcting a position of the drawing area in a horizontal plane with respect to the functional liquid droplet ejection head.

3. The apparatus according to claim 2, wherein the flushing box is supported by the θ-table.

4. The apparatus according to claim 1, wherein a shape of the flushing box corresponds to an inclination of the sagged portion on the suction table side.

5. The apparatus according to claim 1, wherein the work receiving unit winds the work.

6. An apparatus for ejecting liquid droplets for drawing a pattern on a work having a plurality of drawing areas provided in a longitudinal direction, the apparatus comprising:
    a suction table disposed in a drawing space for holding the work by suction;
    a delivering unit that intermittently delivers the work onto the suction table in a downward sagged state;
    a drawing unit that has a functional liquid droplet ejection head and draws a pattern on the work held by suction by driving the functional liquid droplet ejection head to be moved relatively with respect to the drawing space;
    a work receiving unit that receives the drawn-on work in the downward sagged state from the suction table; and
    a flushing unit in the drawing space on a feeding path of the work, the flushing unit including a flushing box for receiving waste ejection from the functional liquid droplet ejection head located at an upper side of at least one of sagged portions of the work.

* * * * *